(12) United States Patent
Heath

(10) Patent No.: US 9,879,716 B2
(45) Date of Patent: *Jan. 30, 2018

(54) SWIVEL ATTACHMENT AND BRANCH LINE RESTRAINT

(71) Applicant: Cooper B-Line, Inc., Houston, TX (US)

(72) Inventor: Richard W. Heath, Yorba Linda, CA (US)

(73) Assignee: Cooper B-Line, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,620

(22) Filed: Oct. 10, 2016

(65) Prior Publication Data

US 2017/0097038 A1   Apr. 6, 2017

Related U.S. Application Data

(63) Continuation of application No. 14/271,357, filed on May 6, 2014, now Pat. No. 9,464,665, which is a continuation of application No. 12/985,215, filed on Jan. 5, 2011, now Pat. No. 8,714,865, which is a continuation of application No. 12/104,313, filed on Apr. 16, 2008, now Pat. No. 7,887,248.

(60) Provisional application No. 60/913,025, filed on Apr. 20, 2007.

(51) Int. Cl.
   *F16C 11/06*   (2006.01)
   *F16L 3/18*   (2006.01)

(52) U.S. Cl.
   CPC ............ *F16C 11/06* (2013.01); *F16L 3/18* (2013.01)

(58) Field of Classification Search
   CPC ..... F16L 3/133; F16L 3/14; F16L 3/16; F16C 11/12; F16C 11/04; F16C 11/0604
   USPC ........ 248/58, 62, 65, 73, 74.1, 274.1, 276.1; 403/57, 150–159, 78–79, 58, 74; 411/383
   See application file for complete search history.

(56) References Cited

U.S. PATENT DOCUMENTS

| | | | | |
|---|---|---|---|---|
| 1,438,831 A | * | 12/1922 | Jones ....................... | B60D 1/44 280/499 |
| 1,848,085 A | * | 3/1932 | Eisenschmidt ........... | E04G 7/02 249/219.1 |
| 2,339,564 A | | 1/1944 | Goldberg et al. | |
| 2,790,617 A | | 4/1957 | Harland | |
| 3,077,809 A | * | 2/1963 | Harding ................ | E21D 11/006 405/302.2 |
| 3,151,511 A | | 10/1964 | Brase | |

(Continued)

*Primary Examiner* — Todd M Epps
(74) *Attorney, Agent, or Firm* — Senniger Powers LLP

(57) ABSTRACT

A swivel attachment and/or branch line restraint device with angular versatility and mobility for facilitating connection of installation components to support a pipe or other load relative to a support surface is provided. Advantageously, embodiments of the device provide a plurality of rotational or swivel degrees of freedom, which are substantially independently controllable, for its mating portions, which respectively engage corresponding mating portions of other installation components. The device embodiments can desirably be configured in male-female, male-male or female-female arrangements to enhance device utility and/or versatility, thereby advantageously allowing for use in a myriad of applications and installations, such as construction, utilities and the like, among others, to reliably support loads.

15 Claims, 29 Drawing Sheets

(56) References Cited

U.S. PATENT DOCUMENTS

| | | | | |
|---|---|---|---|---|
| 3,771,309 A | * | 11/1973 | Peters | F16G 13/16 59/78.1 |
| 4,025,208 A | | 5/1977 | Donahue | |
| 4,034,946 A | | 7/1977 | Zimmer, Jr. | |
| 4,561,797 A | * | 12/1985 | Aldridge | A01D 75/30 172/314 |
| 4,570,885 A | | 2/1986 | Heath | |
| 4,836,485 A | | 6/1989 | Cooper | |
| 5,009,386 A | | 4/1991 | Berger et al. | |
| 5,129,427 A | | 7/1992 | White et al. | |
| 5,192,039 A | | 3/1993 | Williams | |
| 5,312,199 A | | 5/1994 | Smith, Jr. | |
| 5,344,108 A | | 9/1994 | Heath | |
| 5,647,694 A | * | 7/1997 | Locotos | E21D 21/0046 405/259.1 |
| 5,702,077 A | | 12/1997 | Heath | |
| 5,737,982 A | | 4/1998 | Lin | |
| 6,017,071 A | * | 1/2000 | Morghen | B66C 1/66 294/215 |
| 6,138,960 A | | 10/2000 | Carbonare et al. | |
| 6,189,420 B1 | | 2/2001 | Shiao | |
| 6,481,684 B1 | | 11/2002 | Farmer et al. | |
| 6,619,606 B2 | | 9/2003 | Oddsen, Jr. et al. | |
| 6,619,875 B2 | | 9/2003 | Chiang | |
| 6,672,545 B1 | | 1/2004 | Persing | |
| 6,675,546 B2 | | 1/2004 | Coles | |
| 6,755,379 B2 | | 6/2004 | Kirschner | |
| 6,783,102 B2 | | 8/2004 | Kirschner | |
| 6,824,111 B1 | | 11/2004 | Hugli et al. | |
| 7,017,868 B2 | | 3/2006 | Kirschner | |
| 7,046,509 B2 | * | 5/2006 | Hillman | F16M 11/10 188/266 |
| 7,207,527 B2 | | 4/2007 | Opperthauser | |
| 7,284,728 B2 | | 10/2007 | Connolly | |
| 7,665,334 B2 | | 2/2010 | Medina | |
| 7,887,248 B2 | | 2/2011 | Heath | |
| 7,954,777 B2 | * | 6/2011 | Bohm | F16M 11/10 248/274.1 |
| 8,714,865 B2 | | 5/2014 | Heath | |
| 9,464,665 B2 | * | 10/2016 | Heath | F16L 3/16 |
| 2004/0144131 A1 | | 7/2004 | Enevoldsen | |
| 2008/0100060 A1 | | 5/2008 | Hayashi et al. | |
| 2009/0002261 A1 | * | 1/2009 | Bohm | F16M 11/10 343/882 |

* cited by examiner

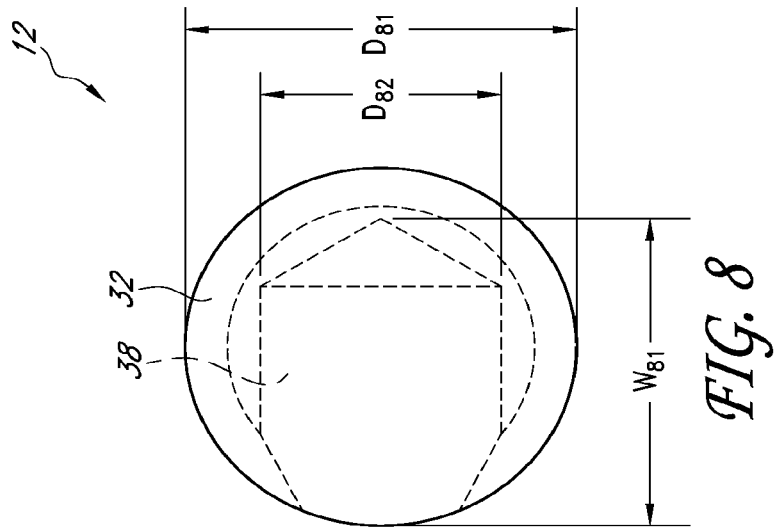
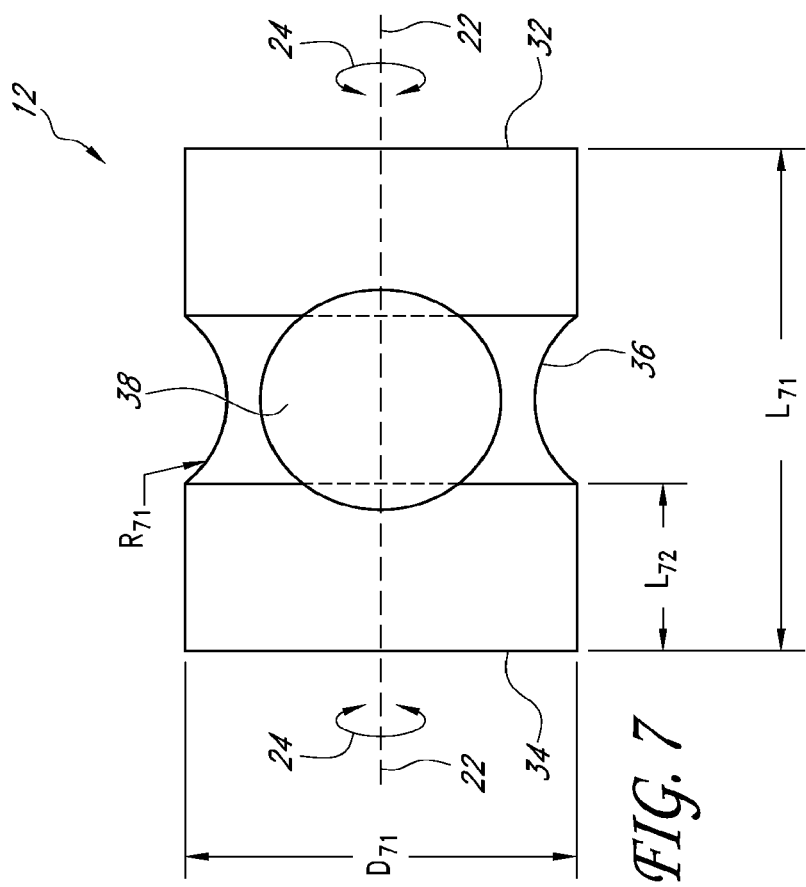

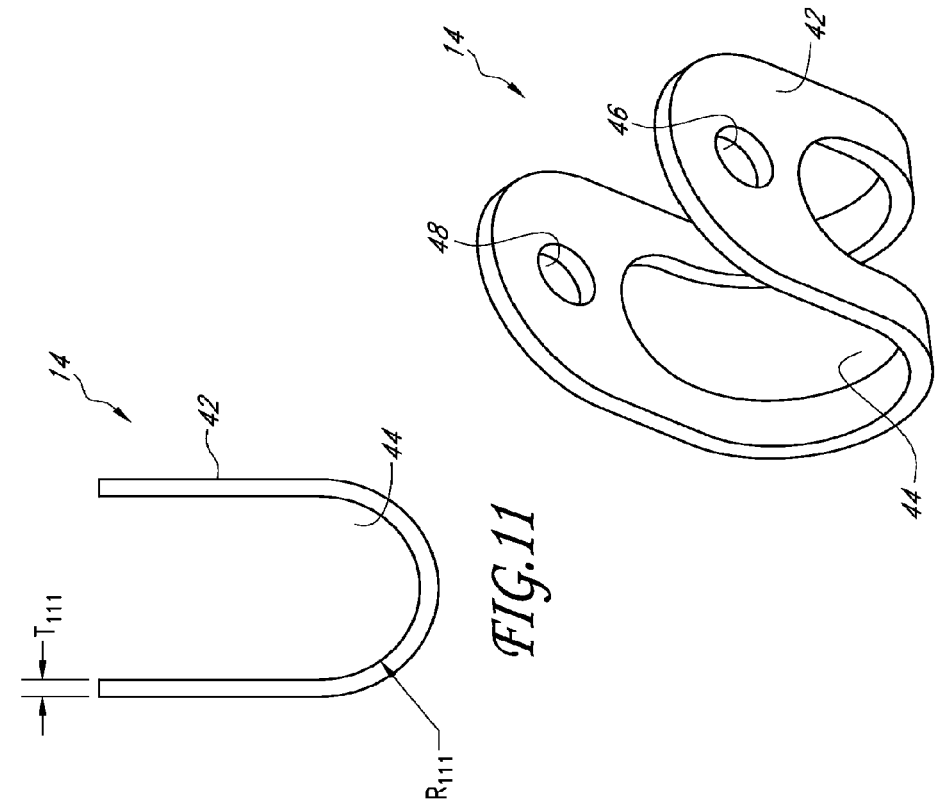
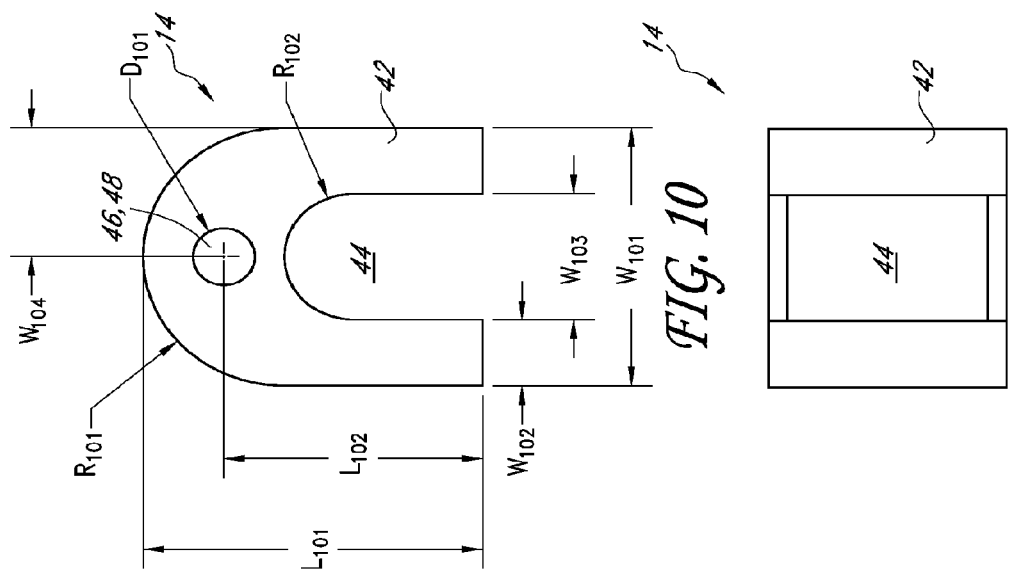
FIG. 9
FIG. 11
FIG. 10
FIG. 12

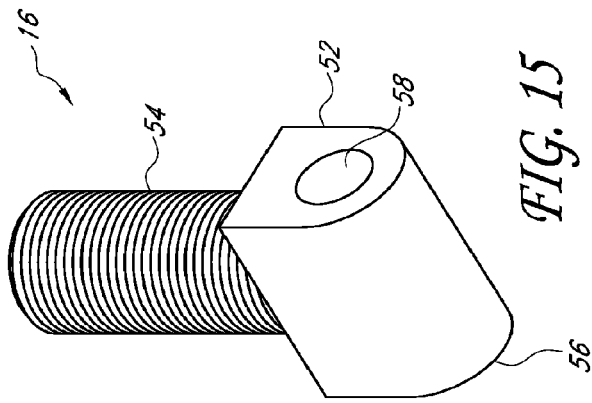
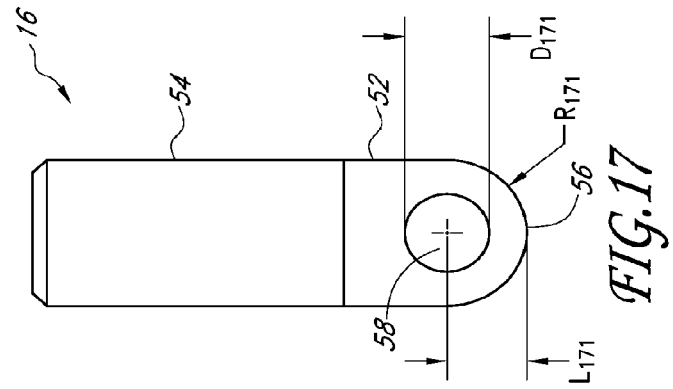
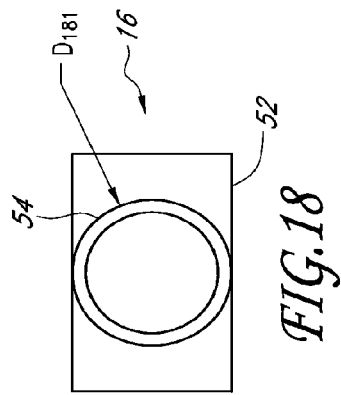
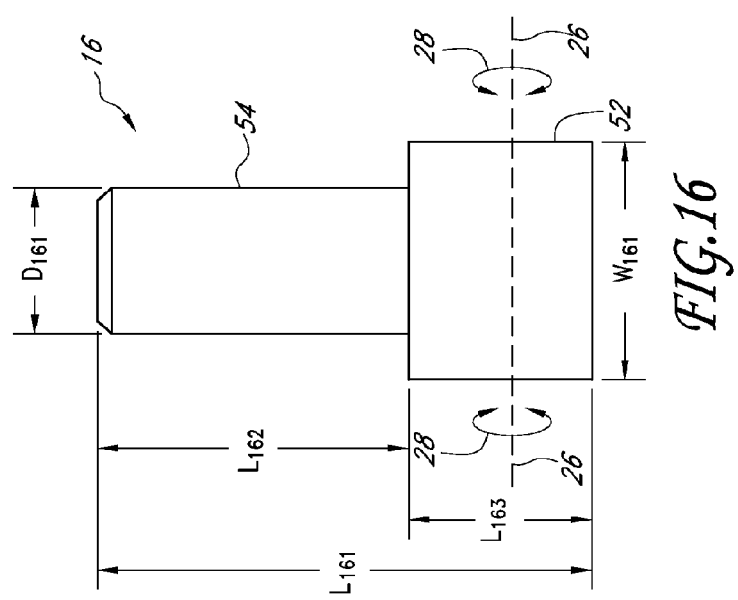

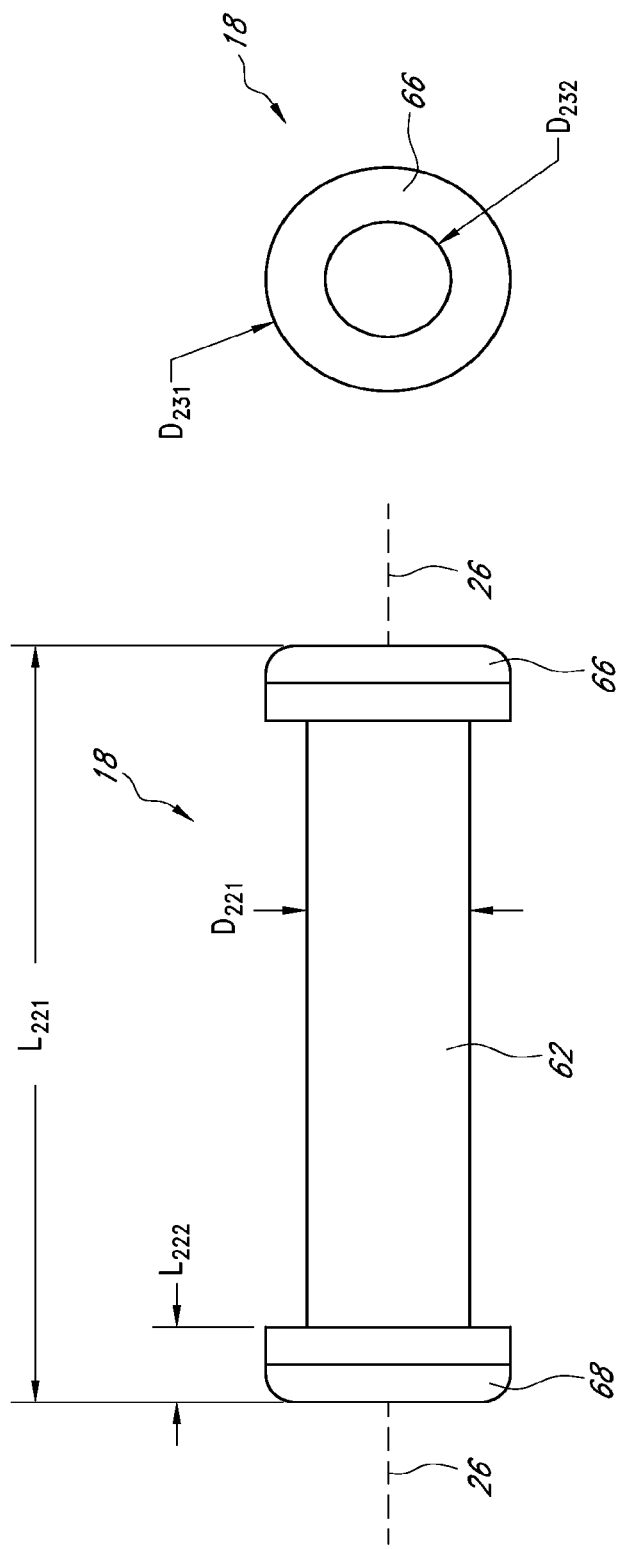

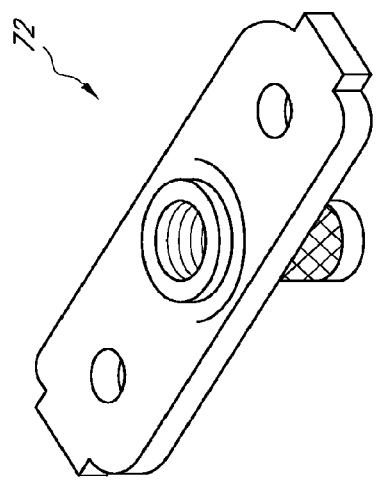
FIG.33
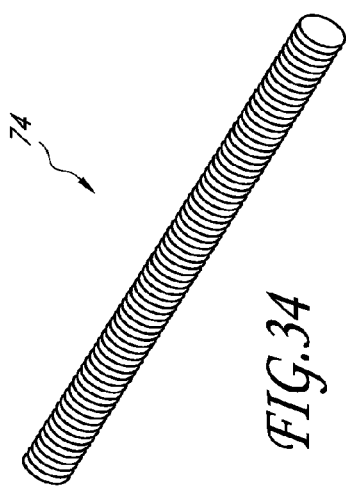
FIG.34
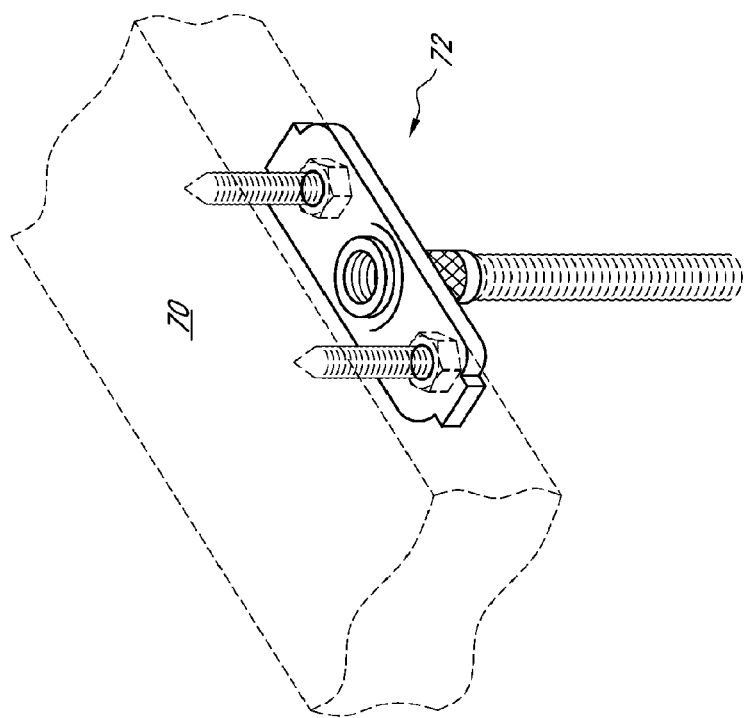

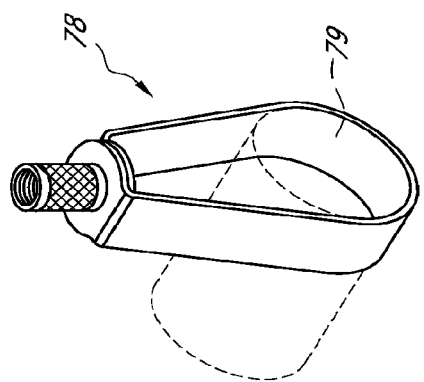
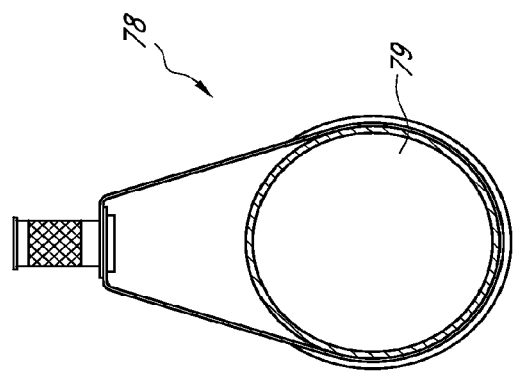
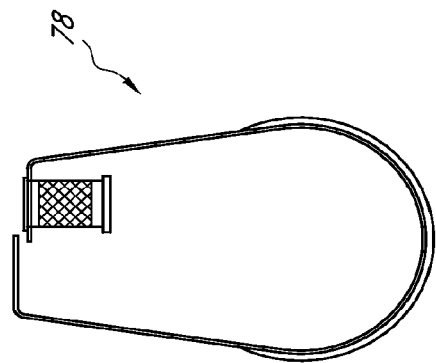
FIG. 35

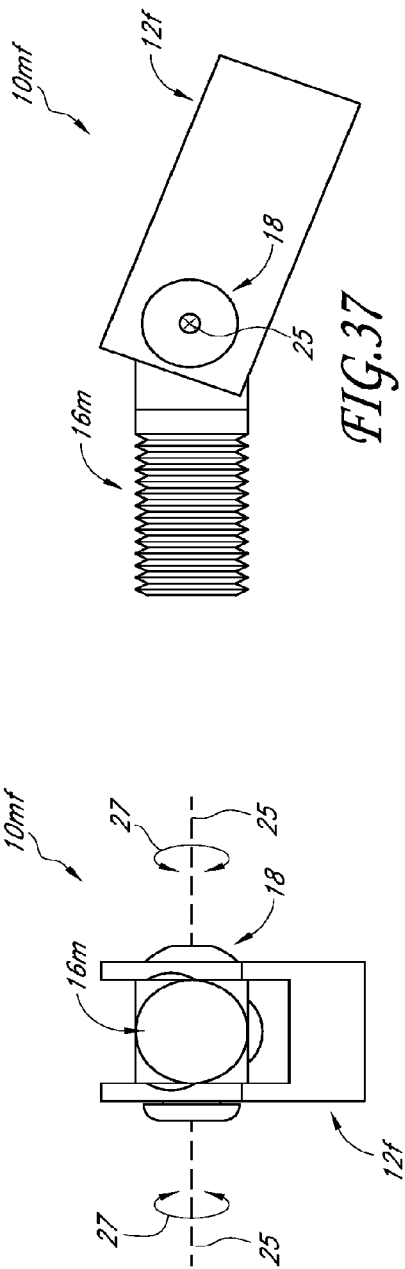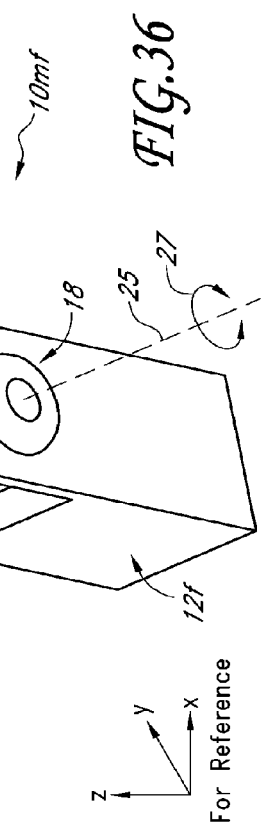

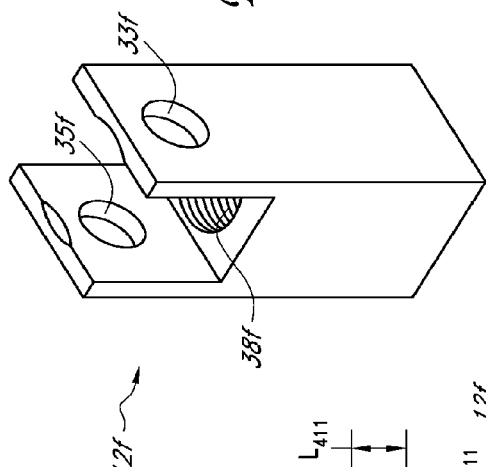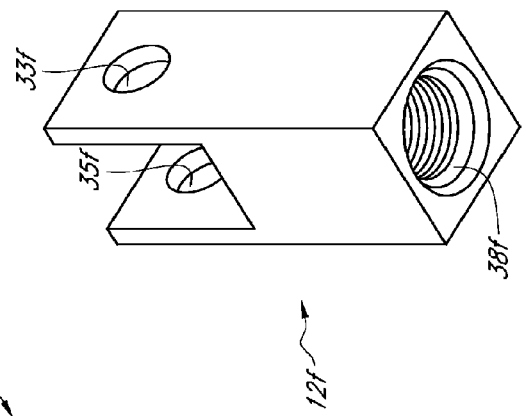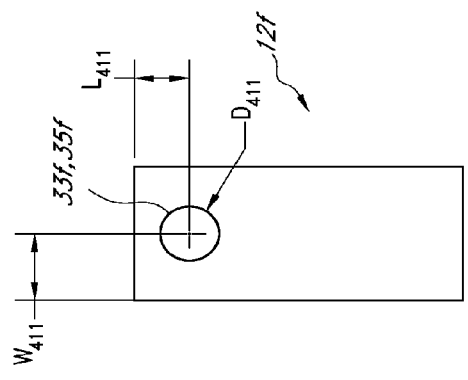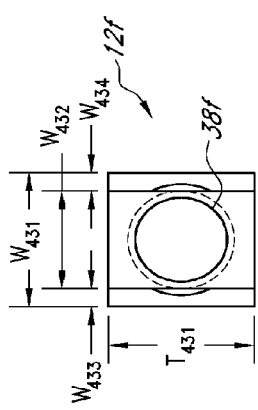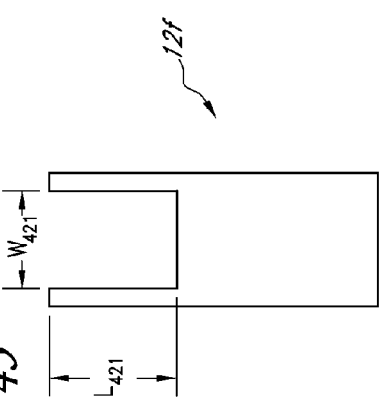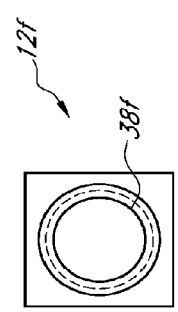
FIG.40
FIG.39
FIG.41
FIG.43
FIG.42
FIG.44

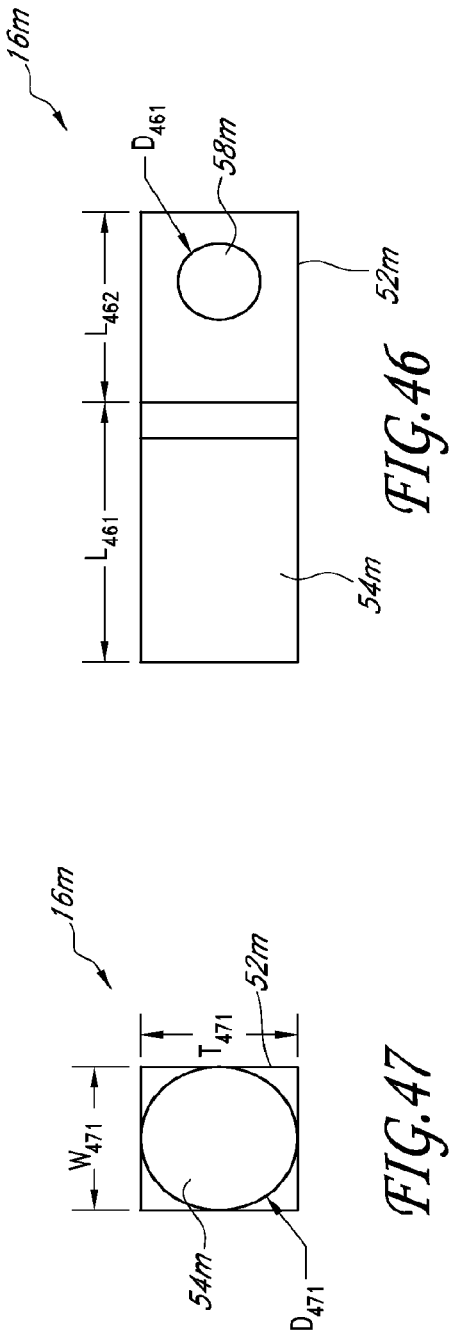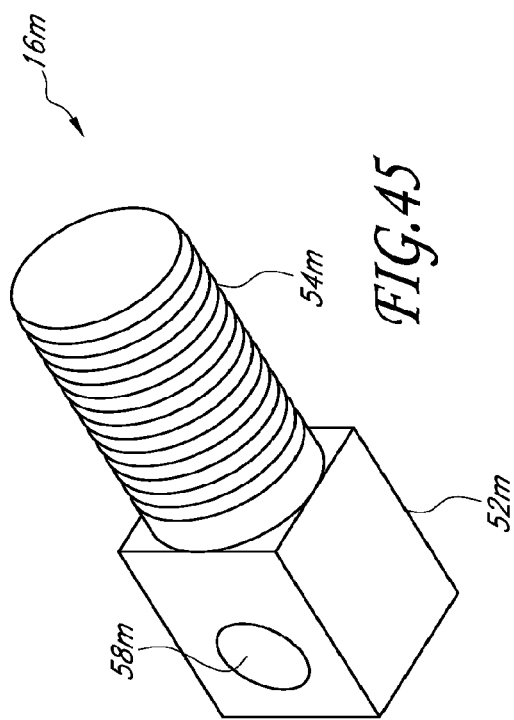

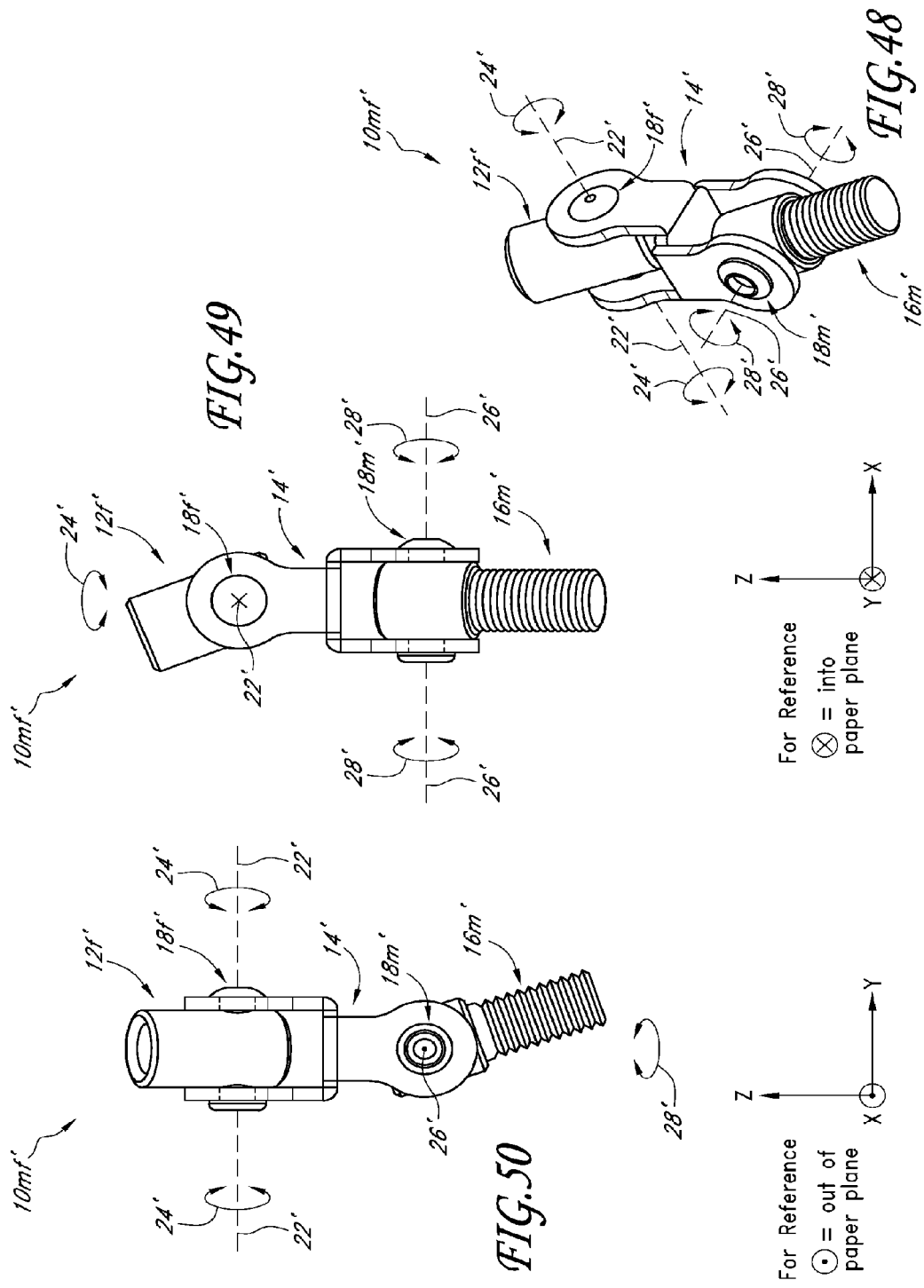

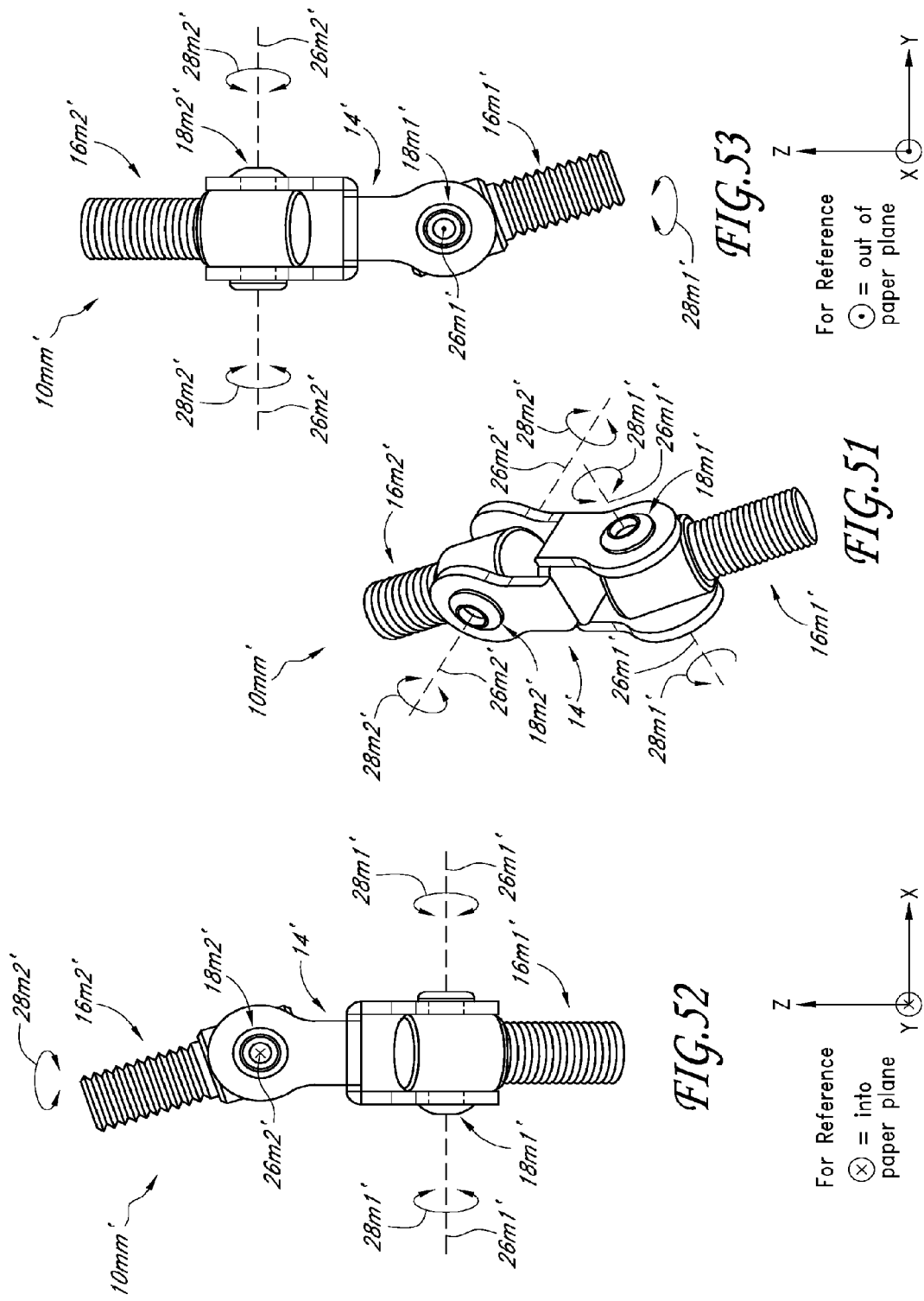

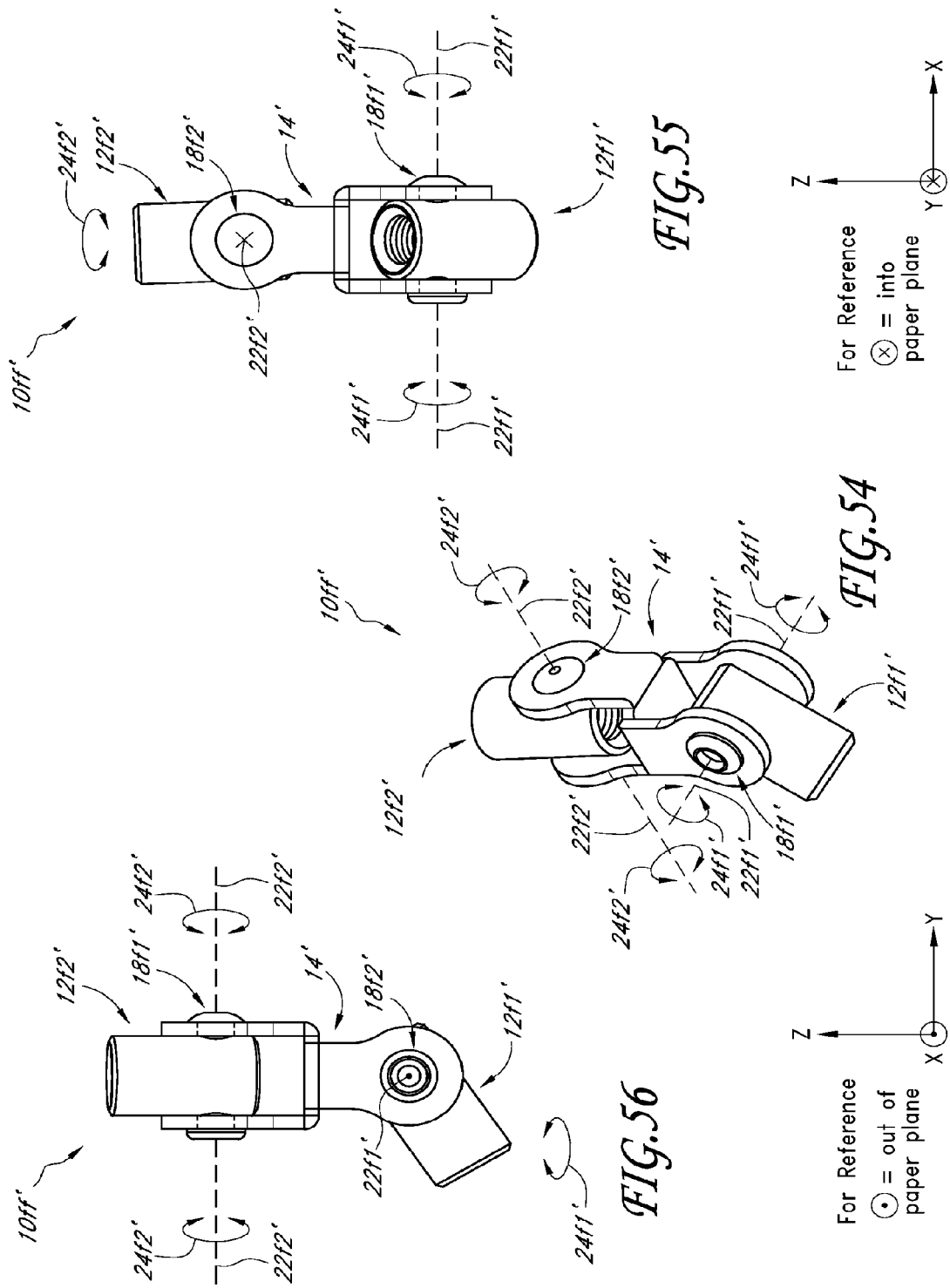

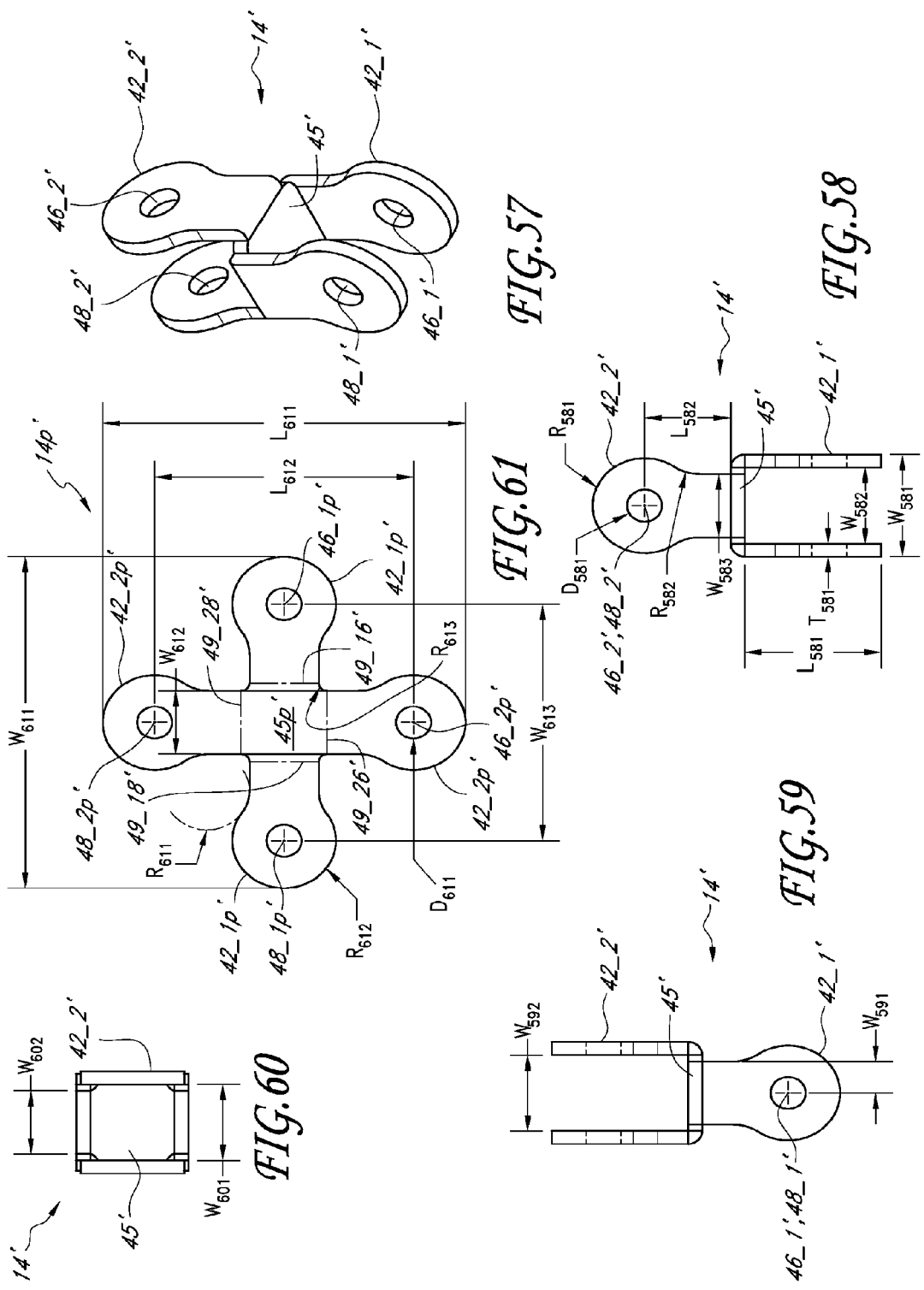

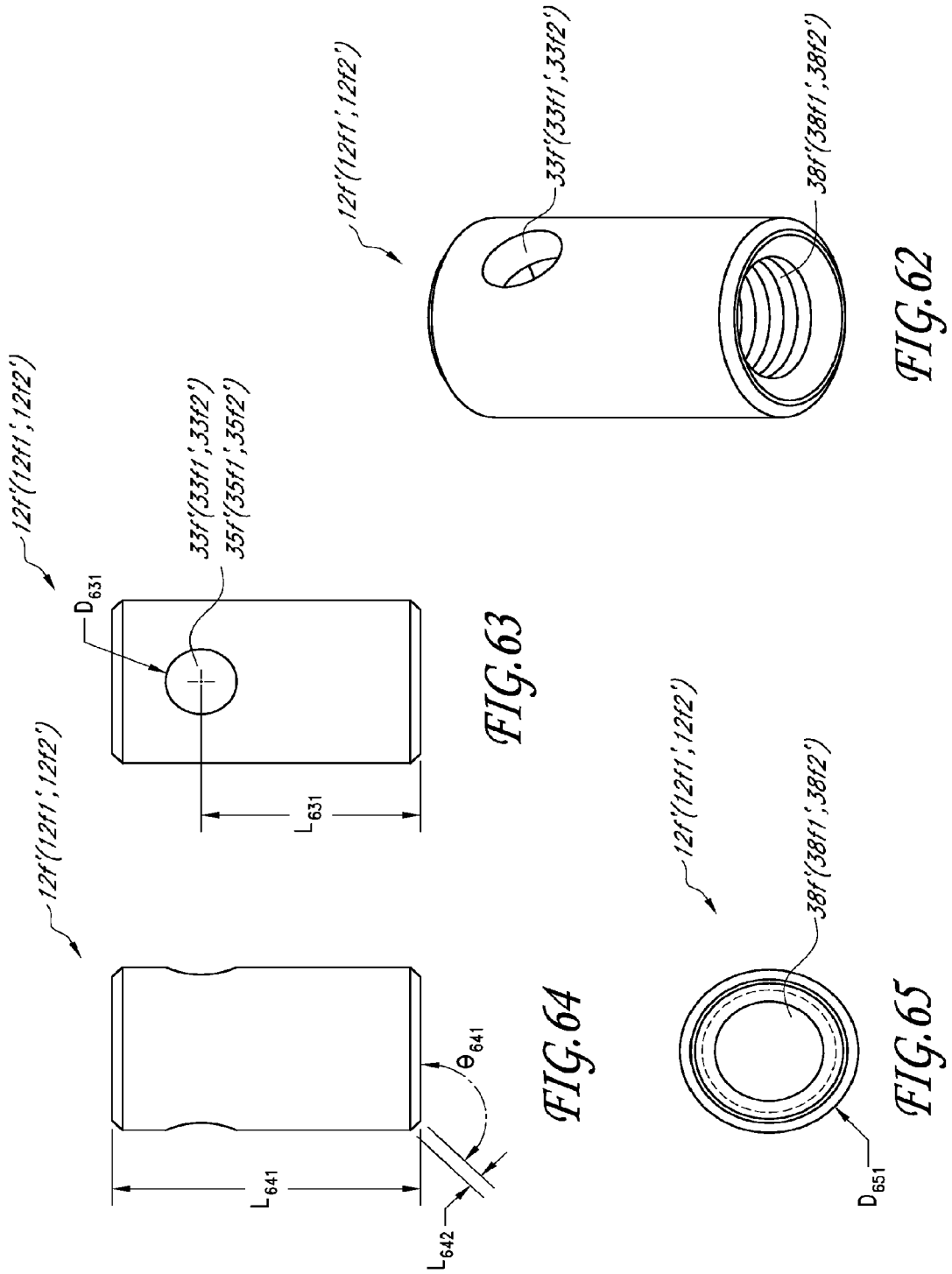

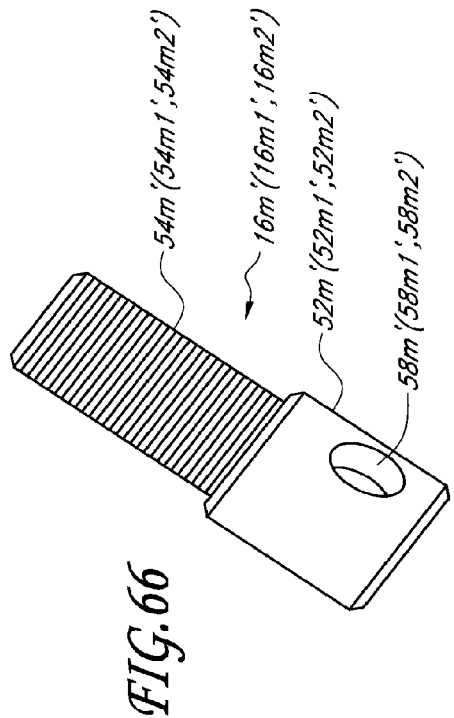
FIG.66
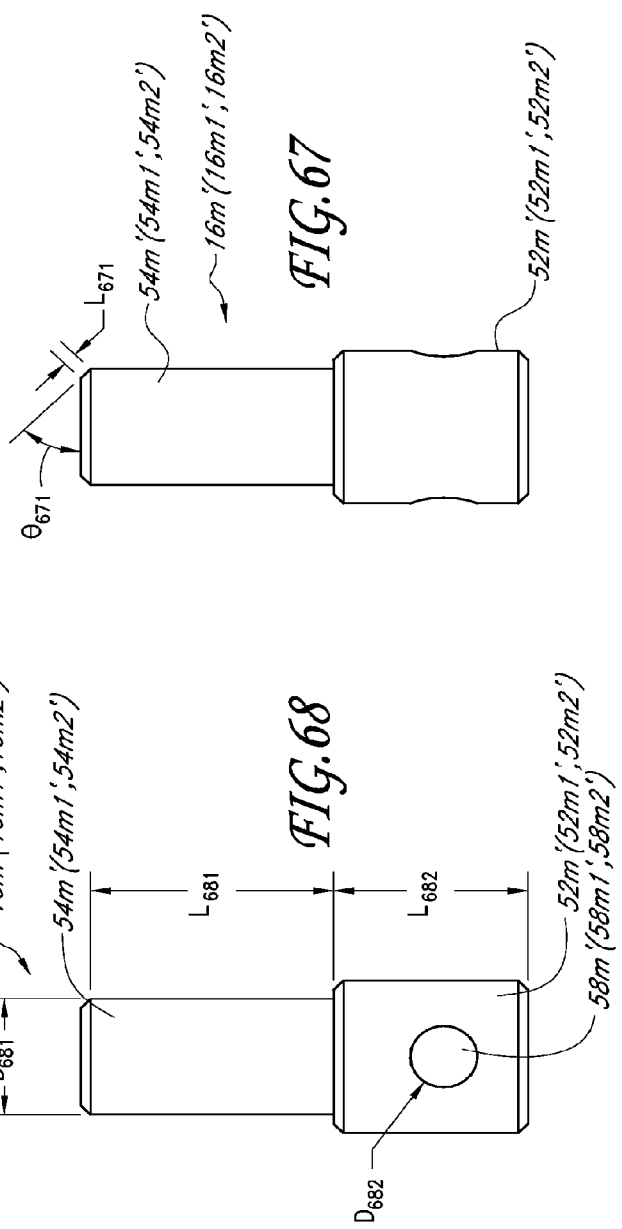
FIG.67
FIG.68
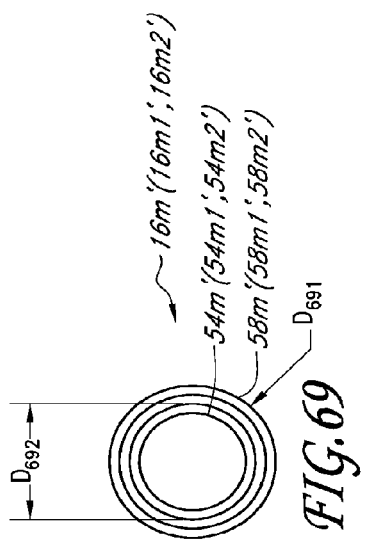
FIG.69

SWIVEL ATTACHMENT AND BRANCH LINE RESTRAINT

CROSS-REFERENCE TO RELATED APPLICATIONS

This application is a continuation of U.S. patent application Ser. No. 14/271,357, now U.S. Pat. No. 9,464,665, which is a continuation of U.S. patent application Ser. No. 12/985,215, filed Jan. 5, 2011, now U.S. Pat. No. 8,714,865, which is a continuation of U.S. patent application Ser. No. 12/104,313, filed Apr. 16, 2008, now U.S. Pat. No. 7,887,248 B2, issued Feb. 15, 2011, which claims the benefit of U.S. Provisional Patent Application Ser. No. 60/913,025, filed Apr. 20, 2007, entitled SWIVEL ATTACHMENT AND BRANCH LINE RESTRAINT, each of which are hereby incorporated by reference in their entirety.

BACKGROUND OF THE INVENTION

Field of the Invention

The present invention generally relates to devices for supporting utility loads and the like. More particularly, the present invention relates to a swivel attachment and/or branch line restraint device that provides enhanced angular versatility in the connection of installation components to support a pipe, branch line or other load suspended from a support surface, against undesirable sway such as may be caused by seismic disturbances.

Description of the Related Art

There are many products and assemblies used by construction, building, plumbing and electrical contractors and workers for bracing and supporting pipes, ducts, sprinkler systems, fans, air-conditioners, electrical cables, communication lines and other loads from ceilings, beams, studs, walls and floors. These products include clamps, braces, cables, hooks, straps, hangers, plates, and brackets, among other items.

Many installations involve the coupling or connection of components which are angularly offset relative to one another. Typical devices used to provide such orientations have several drawbacks.

In many cases, a number of installation components have to be utilized to provide the desired installation structure. Disadvantageously, the use of numerous such components not only adds to the cost, but also undesirably adds to the installation time, which further adds to the overall cost.

In several cases, conventional installation components used for connection purposes can lack the desired degree of versatility to provide a reliable and/or compact installation. In these cases, custom components may have to be manufactured in an attempt to achieve the desired goal. Again this undesirably adds to the overall cost, and may also disadvantageously not provide for efficient use and utility.

Many devices commonly used in the industry for connection purposes in an installation can be difficult to install and expensive. Additionally, and undesirably, these devices may not be suited for reliably sustaining loads.

SUMMARY OF THE INVENTION

Some embodiments of the present invention advantageously provide a swivel attachment and/or branch line restraint device with angular versatility and mobility for facilitating connection of installation components to support a pipe or other load relative to a support surface. Advantageously, in accordance with certain embodiments, the device provides a plurality of rotational or swivel degrees of freedom, which are substantially independently controllable, for its mating portions, which respectively engage corresponding mating portions of other installation components. The device provides various embodiments which can desirably be configured in male-female, male-male or female-female arrangements to enhance device utility and/or versatility, thereby advantageously allowing for use in a myriad of applications, installations, and the like, to reliably sustain loads.

Certain embodiments provide a swivel attachment generally comprising a rotatable barrel, a saddle, a rotatable stud and a connector pin. The rotatable barrel generally comprises a first mating portion that is rotatable relative to a first rotation axis and substantially in a first plane. The saddle generally houses the barrel and generally comprises a slot exposing at least a portion of the first mating portion. The rotatable stud generally comprises a second mating portion that is rotatable relative to a second rotation axis and substantially in a second plane. The connector pin couples the barrel, the saddle and the stud such that the first mating portion and the second mating portion are substantially independently rotatable for connection to respective installation components.

Certain embodiments provide a swivel attachment generally comprising a first portion, a second portion and a coupling mechanism. The first portion generally comprises a rotatable first mating portion. The second portion generally comprises a rotatable second mating portion. The coupling mechanism is substantially intermediate the first portion and the second portion, and connects the first portion and the second portion to provide or enable substantially independent rotation between the first mating portion and the second mating portion.

Certain embodiments provide a method of supporting a load using a swivel attachment. The method generally comprises rotating a first portion of the swivel attachment and matingly connecting the first portion to a first installation component wherein the first portion generally comprises a first mating portion. A second portion of the swivel attachment is rotated and matingly connected to a second installation component wherein the second portion generally comprises a second mating portion. The rotating of the first and second portions generally comprises substantially independent rotation between the first mating portion and the second mating portion, and wherein the first installation component is connected to the load and the second installation component is connected to a support structure.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 7 is another simplified bottom view of the barrel of FIG. 4 (showing some hidden lines) illustrating features and advantages in accordance with certain embodiments of the invention.

FIG. 8 is another simplified end view of the barrel of FIG. 4 (showing some hidden lines) illustrating features and advantages in accordance with certain embodiments of the invention.

FIG. 9 is a is a simplified perspective view of a saddle of the swivel attachment of FIGS. 1-3 illustrating features and advantages in accordance with certain embodiments of the invention.

FIG. 10 is a simplified side view of the saddle of FIG. 9 illustrating features and advantages in accordance with certain embodiments of the invention.

FIG. 11 is a simplified end view of the saddle of FIG. 9 illustrating features and advantages in accordance with certain embodiments of the invention.

FIG. 12 is a simplified bottom view of the saddle of FIG. 9 illustrating features and advantages in accordance with certain embodiments of the invention.

FIG. 15 is a simplified perspective view of a tee swivel stud of the swivel attachment of FIGS. 1-3 illustrating features and advantages in accordance with certain embodiments of the invention.

FIG. 16 is a simplified front view of the swivel stud of FIG. 15 illustrating features and advantages in accordance with certain embodiments of the invention.

FIG. 17 is a simplified side view of the swivel stud of FIG. 15 illustrating features and advantages in accordance with certain embodiments of the invention.

FIG. 18 is a simplified top view of the swivel stud of FIG. 15 illustrating features and advantages in accordance with certain embodiments of the invention.

FIG. 22 is a simplified side view of a rivet member of the swivel attachment of FIGS. 1-3 illustrating features and advantages in accordance with certain embodiments of the invention.

FIG. 23 is a simplified end view of the rivet member of FIG. 22 illustrating features and advantages in accordance with certain embodiments of the invention.

FIG. 33 is simplified views of a ceiling plate for use in conjunction with the swivel attachment of FIGS. 1-3 to form an installation illustrating features and advantages in accordance with certain embodiments of the invention.

FIG. 34 is a simplified view of a threaded rod for use in conjunction with the swivel attachment of FIGS. 1-3 to form an installation illustrating features and advantages in accordance with certain embodiments of the invention.

FIG. 35 is simplified views of an adjustable band hanger for use in conjunction with the swivel attachment of FIGS. 1-3 to form an installation illustrating features and advantages in accordance with certain embodiments of the invention.

FIG. 36 is a simplified perspective view of a of a male-female swivel attachment illustrating features and advantages in accordance with certain other embodiments of the invention.

FIG. 37 is a simplified side view of the swivel attachment of FIG. 36 illustrating features and advantages in accordance with certain embodiments of the invention.

FIG. 38 is a simplified top view of the swivel attachment of FIG. 36 illustrating features and advantages in accordance with certain embodiments of the invention.

FIGS. 39 and 40 are simplified perspective views of a of a female swivel attachment member of the swivel attachment of FIG. 36 illustrating features and advantages in accordance with certain embodiments of the invention.

FIG. 41 is a simplified side view of the female swivel attachment member of FIGS. 39 and 40 illustrating features and advantages in accordance with certain embodiments of the invention.

FIG. 42 is a simplified front view of the female swivel attachment member of FIGS. 39 and 40 illustrating features and advantages in accordance with certain embodiments of the invention.

FIG. 43 is a simplified top view of the female swivel attachment member of FIGS. 39 and 40 illustrating features and advantages in accordance with certain embodiments of the invention.

FIG. 44 is a simplified bottom view of the female swivel attachment member of FIGS. 39 and 40 illustrating features and advantages in accordance with certain embodiments of the invention.

FIG. 45 is a simplified perspective view of a of a male swivel attachment member of the swivel attachment of FIG. 36 illustrating features and advantages in accordance with certain embodiments of the invention.

FIG. 46 is a simplified side view of the male swivel attachment member of FIG. 45 illustrating features and advantages in accordance with certain embodiments of the invention.

FIG. 47 is a simplified top view of the male swivel attachment member of FIG. 45 illustrating features and advantages in accordance with certain embodiments of the invention.

FIG. 48 is a simplified perspective view of a of a male-female swivel attachment illustrating features and advantages in accordance with certain further embodiments of the invention.

FIG. 49 is a simplified side view of the swivel attachment of FIG. 48 illustrating features and advantages in accordance with certain embodiments of the invention.

FIG. 50 is another simplified side view of the swivel attachment of FIG. 48 illustrating features and advantages in accordance with certain embodiments of the invention.

FIG. 51 is a simplified perspective view of a of a male-male swivel attachment illustrating features and advantages in accordance with certain embodiments of the invention.

FIG. 52 is a simplified side view of the swivel attachment of FIG. 51 illustrating features and advantages in accordance with certain embodiments of the invention.

FIG. 53 is another simplified side view of the swivel attachment of FIG. 50 illustrating features and advantages in accordance with certain embodiments of the invention.

FIG. 54 is a simplified perspective view of a of a female-female swivel attachment illustrating features and advantages in accordance with certain embodiments of the invention.

FIG. 55 is a simplified side view of the swivel attachment of FIG. 54 illustrating features and advantages in accordance with certain embodiments of the invention.

FIG. 56 is another simplified side view of the swivel attachment of FIG. 54 illustrating features and advantages in accordance with certain embodiments of the invention.

FIG. 57 is a simplified perspective view of a saddle/center of the swivel attachments of FIGS. 48, 51 and 54 illustrating features and advantages in accordance with certain embodiments of the invention.

FIG. 58 is a simplified side view of the swivel attachment saddle/center of FIG. 57 illustrating features and advantages in accordance with certain embodiments of the invention.

FIG. 59 is another simplified side view of the swivel attachment saddle/center of FIG. 57 illustrating features and advantages in accordance with certain embodiments of the invention.

FIG. 60 is a simplified top view of the swivel attachment saddle/center of FIG. 57 illustrating features and advantages in accordance with certain embodiments of the invention.

FIG. 61 is a simplified planar view of the swivel attachment saddle/center of FIG. 57 illustrating features and advantages in accordance with certain embodiments of the invention.

FIG. 62 is a simplified perspective view of a female member of the swivel attachments of FIGS. 48 and 54 illustrating features and advantages III accordance with certain embodiments of the invention.

FIG. 63 is a simplified side view of the female member of FIG. 62 illustrating features and advantages in accordance with certain embodiments of the invention.

FIG. 64 is another simplified side view of the female member of FIG. 62 illustrating features and advantages in accordance with certain embodiments of the invention.

FIG. 65 is a simplified bottom view of the female member of FIG. 62 illustrating features and advantages in accordance with certain embodiments of the invention.

FIG. 66 is a simplified perspective view of a male member of the swivel attachments of FIGS. 48 and 51 illustrating features and advantages in accordance with certain embodiments of the invention.

FIG. 67 is a simplified side view of the male member of FIG. 66 illustrating features and advantages in accordance with certain embodiments of the invention.

FIG. 68 is another simplified side view of the male member of FIG. 66 illustrating features and advantages in accordance with certain embodiments of the invention.

FIG. 69 is a simplified top view of the male member of FIG. 66 illustrating features and advantages in accordance with certain embodiments of the invention.

DETAILED DESCRIPTION OF THE PREFERRED EMBODIMENTS

Figure 1:
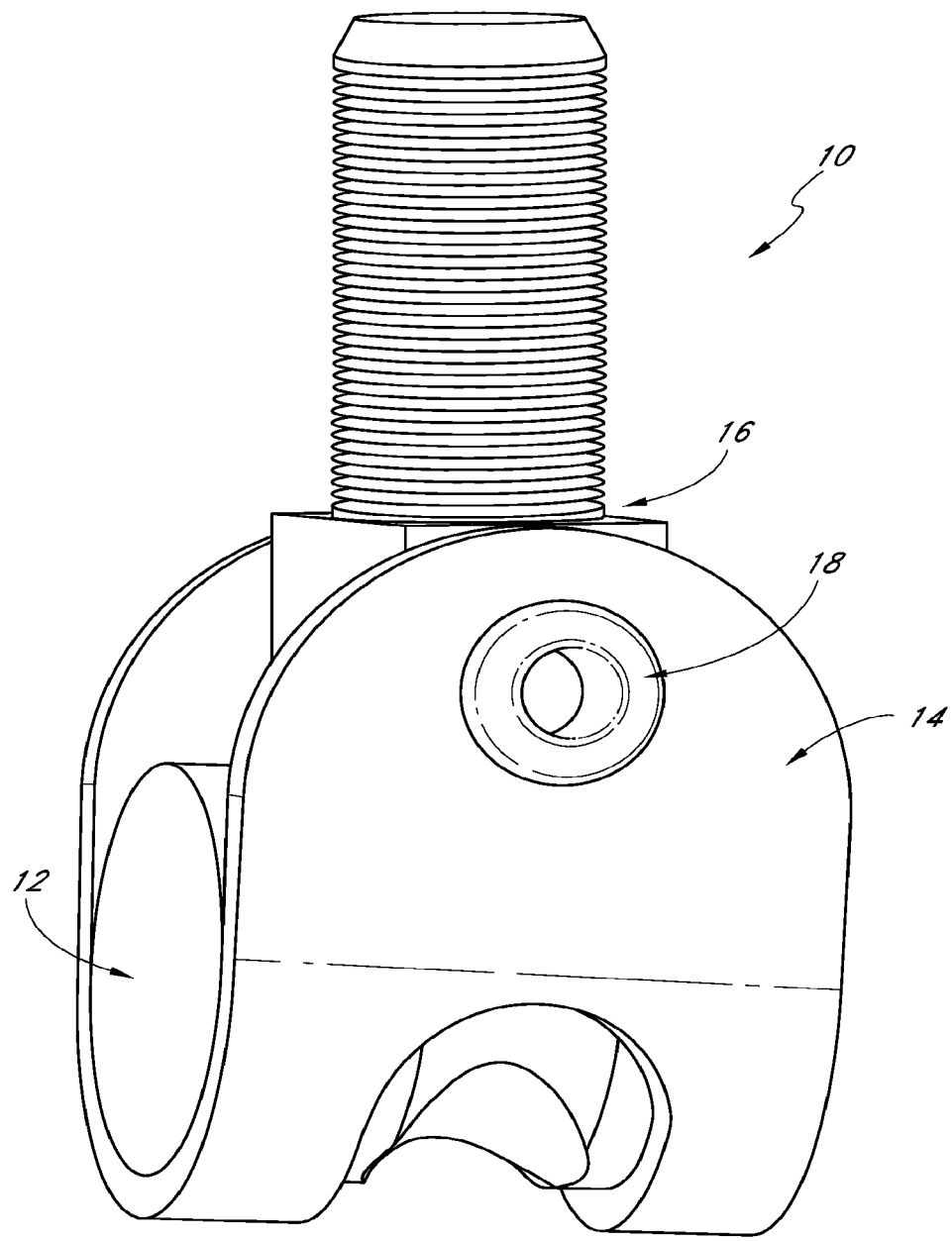
FIGS. 1-3 are simplified perspective views of a swivel attachment illustrating features and advantages in accordance with certain embodiments of the invention.

The preferred embodiments of the invention described herein relate generally to devices for supporting utility loads and the like and, in particular, to a swivel attachment and/or branch line restraint device which provides enhanced angular versatility in the connection of installation components to support a pipe, branch line or other load suspended from a support surface, against undesirable sway and seismic disturbances.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Some embodiments of the invention provide a swivel attachment and branch line restraint device which advantageously provides two substantially independent rotational degrees of freedom (or two substantially independently controllable rotational degrees of freedom), to desirably facilitate connection and enhance device versatility—the two degrees of freedom, in some embodiments, are desirably angularly offset or displaced relative to one another by a predetermined angle. The degrees of freedom can efficaciously comprise, for example, but not limited to, pitch, yaw and roll motions.

In certain embodiments, the device is advantageously utilized as an attachment for a hanger to connect to a pitched or angled roof or surface. In certain embodiments, the device desirably is used as a seismic rod attachment to a structure. In certain embodiments, the device advantageously is used as an upper attachment for an end of a branch line restraint.

Certain embodiments of the swivel attachment and branch line restraint device provide swivel, rotation or pivot capabilities of up to about 90°, including all values and sub-ranges therebetween. The maximum swivel angle of substantially independent two degrees of freedom may be about the same or they can be different with efficacy, as needed or desired. In modified embodiments, swivel, rotation or pivot capabilities of greater than about 90° may be efficaciously provided, as needed or desired.

In certain embodiments, the swivel attachment is configured to comprise a male-female connection device. In certain embodiments, the swivel attachment is configured to comprise a male-male connection device. In certain embodiments, the swivel attachment is configured to comprise a female-female connection device.

In certain embodiments, the swivel attachment is configured to mate with and/or to be compatible with a ⅜ inch rod structure. In modified embodiments, the swivel attachment may be efficaciously configured to mate with and/or be compatible with different sizes of rods, pins, connectors or other attachment devices and the like, among others, as needed or desired.

In certain embodiments, the swivel attachment can be configured to mate with and/or to be compatible with supporting an up to about 4 inches nominal diameter pipe, including all lower values and sub-ranges therein. In modified embodiments, the swivel attachment may be efficaciously configured to support pipes of greater size, as needed or desired.

Figure 2:
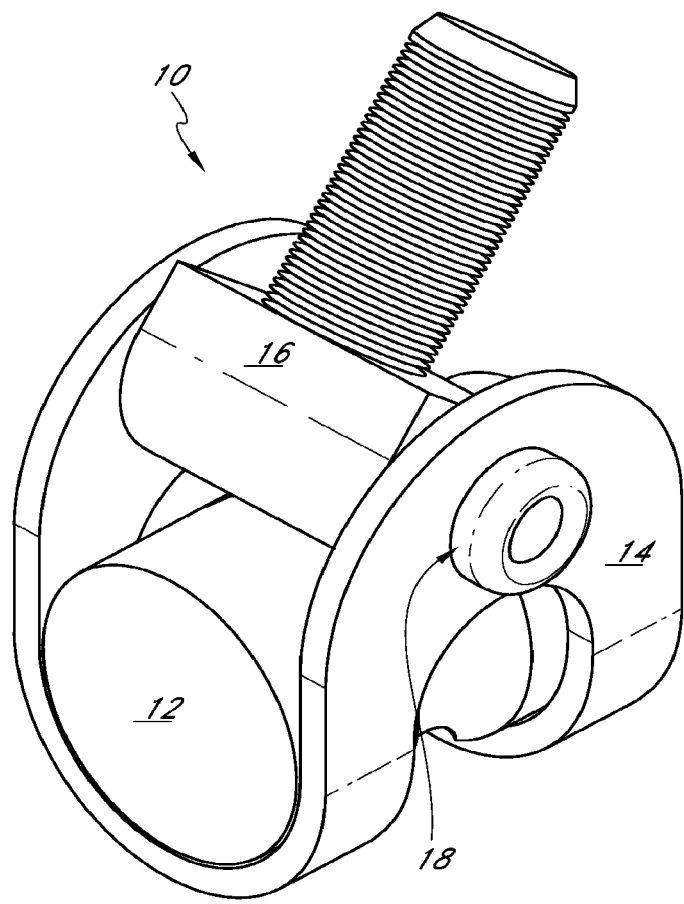
Figure 3:
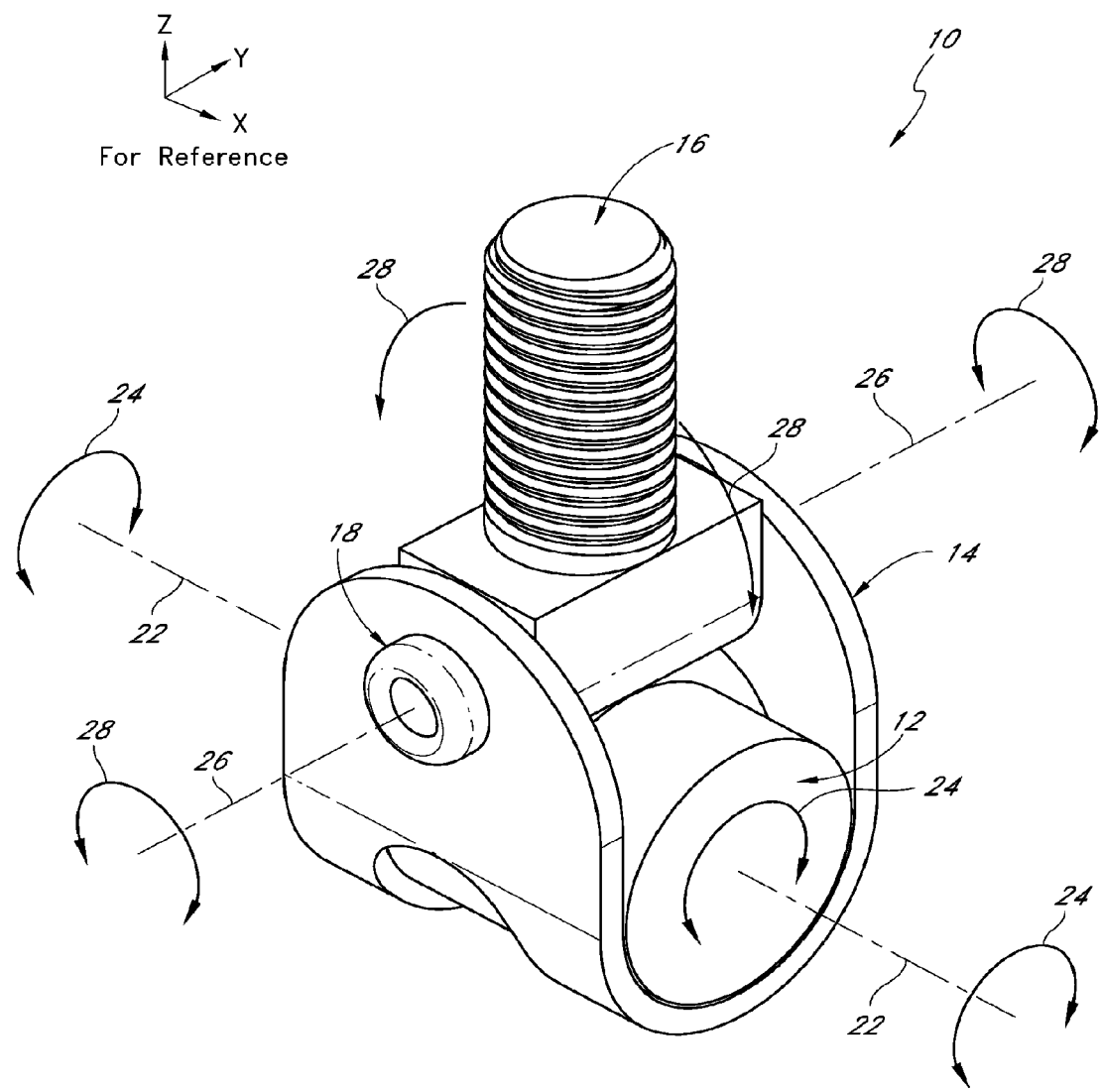
Figure 6:
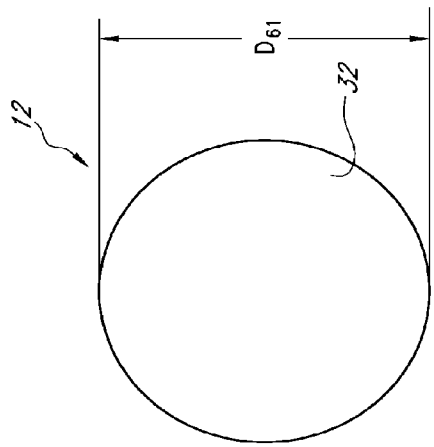
FIG. 6 is a simplified end view of the barrel of FIG. 4 illustrating features and advantages in accordance with certain embodiments of the invention.

The swivel attachment device in accordance with embodiments of the invention is desirably easy to use and install. Moreover, advantageously, it can be relatively inexpensive to manufacture, for example, but not limited to, by using suitable automated methods FIGS. 1-3 show different views of some embodiments of a double swivel attachment or connector (and branch line restraint) device 10. As discussed further herein, the swivel attachment 10 comprises a male-female connection configuration and/or arrangement in accordance with certain embodiments. This swivel attachment device 10 may be modified to provide a male-male or female-female connection configuration and/or arrangement with efficacy, as needed or desired. Certain embodiments of male-male and female-female swivel attachment configurations are also discussed in further detail herein.

The swivel attachment 10, in accordance with certain embodiments, and as discussed in further detail herein, comprises a male member, element, portion or section and a female member, element, portion or section. The swivel attachment male member can comprise a threaded rod, pin, connector, other suitable attachment device or the like with male mating/engaging/articulating features, among others, which male member matingly engages a female member, for example, of an installation component. The swivel attachment female member can comprise a threaded hole, cavity, opening, clamping member, other suitable attachment device or the like with female mating/engaging/articulating features, among others which matingly engages a male member, for example, of an installation component.

In some embodiments, the swivel attachment 10 generally comprises a female barrel member, element, portion or section 12, a saddle member, element, portion or section 14 that houses or receives the barrel 12, a male stud member, element, portion or section 16, and a rivet member, structure, element, portion or section 18 that couples the various device components to form an assembly.

Referring in particular to FIG. 3, an X-Y-Z Cartesian coordinate axis or system is shown for reference purposes only. The female barrel 12 is rotatable, pivotable or swivelable about an axis 22 that is generally coincident or parallel with the X-axis as generally depicted by arrows 24 to provide a first rotational degree of freedom which generally lies in a Y-Z plane(s).

The male stud 16 is rotatable, pivotable or swivelable about an axis 26 that is generally coincident or parallel with the Y-axis as generally depicted by arrows 28 to provide a second rotational degree of freedom which generally lies in an X-Z plane(s). These two degrees of freedom are substantially independent of one another and can be controlled substantially independently to provide enhanced versatility in connecting the swivel attachment 10 to, for example, installations with varying angular configurations.

The two degrees of freedom and/or the planes in which the female barrel 12 and the male stud 16 rotate, pivot or swivel are, in some embodiments, substantially perpendicular (that is, at) 90° to one another. In modified embodiments, the two degrees of freedom and/or the respective corresponding planes they represent may efficaciously be oriented relative to one another at larger or smaller angles, for example, at (90°±θ), where θ is in the range from about greater than 0° to about less than 90°, including all values and subs-ranges therebetween, as needed or desired.

In certain embodiments, the two rotation axes 22 and 26 are substantially perpendicular (that is, at 90°) to one another and are spatially offset (in a Z-direction) relative to one another. In other embodiments, the two rotation axes may spatially intersect or substantially overlap, as needed or desired. In modified embodiments, the two rotation axes may efficaciously be oriented relative to one another at larger or smaller angles, for example, at (90°±α), where α is in the range from about greater than 0° to about less than 90°, including all values and subs-ranges therebetween, as needed or desired.

The following Table illustrates approximate dimensions in inches and weight in pounds of certain exemplary embodiments, but without limitation (total weight of the swivel attachment 10 based on the following is about 0.133 pounds):

| Component | Thickness | Width | Length | Weight |
|---|---|---|---|---|
| Barrel 12 | — | .0624 | .0875 | 0.056 |

-continued

| Component | Thickness | Width | Length | Weight |
|---|---|---|---|---|
| Saddle 14 | 0.062 | 0.875 | 2.466 | 0.027 |
| Swivel Stud 16 | 0.625 | 0.375 | 1.189 | 0.042 |
| Tubular Rivet 18 | — | 0.280 | 0.780 | 0.008 |

FIGS. 4-8 show various views of certain embodiments of the rotatable, pivotable or swivelable female barrel 12. One or more of these figures may show hidden lines in phantom.

In some embodiments, the female barrel 12 generally comprises a generally cylindrical configuration with two opposed and exposed generally flat ends 32, 34, a generally central semi-circular or curved groove, channel or track 36, and a generally central female threaded hole, cavity or opening 38 located at around a bottom or lower portion of the barrel 12 and substantially aligned with the groove 36. The female barrel 12 is advantageously substantially independently rotatable, pivotable, or swivelable, about the rotation axis 22, as generally denoted by arrows 24, relative to the male stud 16.

The groove 36, in certain embodiments, is specially configured to engage a portion of the male stud 16 by being dimensioned with a particular radius of curvature. In some embodiments, the female threaded hole 38 has an open end and a closed end of a particular size to matingly engage an installation component, such as a threaded rod or the like.

Figure 5:
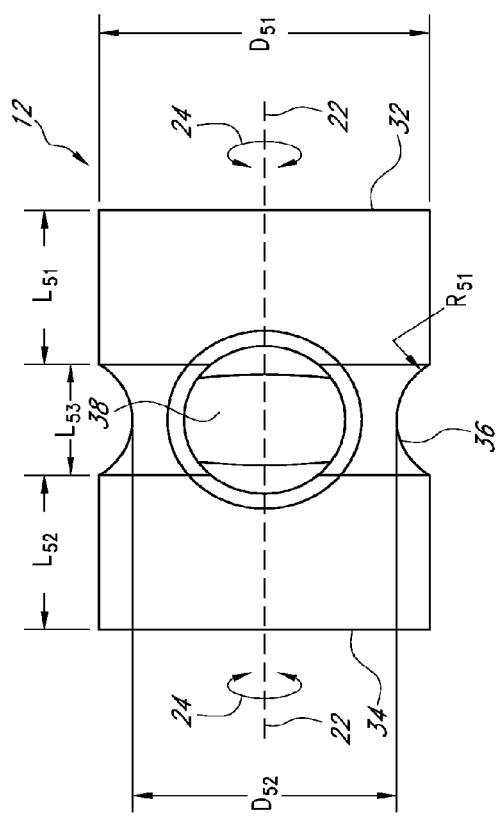
FIG. 5 is a simplified bottom view of the barrel of FIG. 4 illustrating features and advantages in accordance with certain embodiments of the invention.
Figure 4:
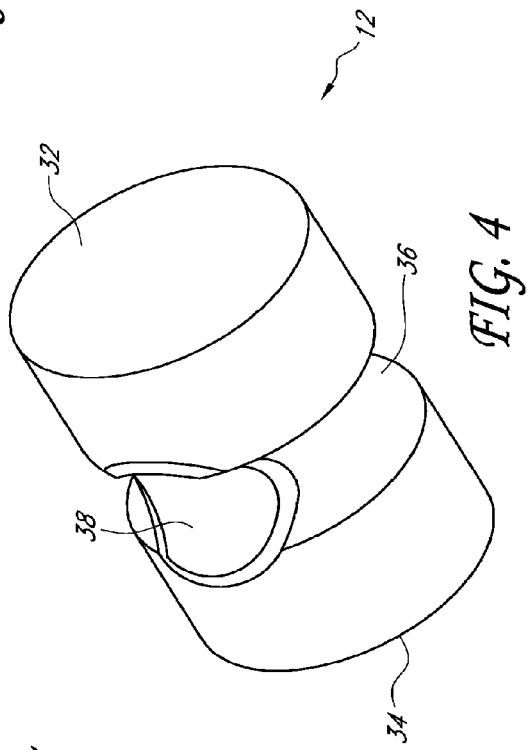
FIG. 4 is a simplified perspective view of a barrel of the swivel attachment of FIGS. 1-3 illustrating features and advantages in accordance with certain embodiments of the invention.

The barrel 12 can be efficaciously sized and dimensioned in various manners, as needed or desired. Referring in particular to FIG. 5, in some embodiments, the dimensions or lengths $L_{51}$ and $L_{52}$ are about 0.319 inches, the dimension or length $L_{53}$ is about 0.235 inches, the diameter $D_{51}$ (and the diameter $D_{61}$ of FIG. 6) is about 0.624 inches, the diameter $D_{52}$ is about 0.5 inches, and the radius of curvature $R_{51}$ is about 0.188 inches. In some embodiments, the threaded hole 38 is formed by using a standard ⅜-16 N.C. size tap drill format and is about 0.437 inches deep.

Referring in particular to FIG. 7, in some embodiments, the dimension or length is $L_{71}$ is about 0.875 inches, the dimension or length is $L_{72}$ is typically about 0.294 inches, the diameter $D_{71}$ is about 0.624 inches, and the radius of curvature $R_{71}$ is about 0.188 inches.

Referring in particular to FIG. 8, in some embodiments, the dimension or width $W_{81}$ is about 0.538 inches, the diameter $D_{81}$ is about 0.624 inches, and the diameter $D_{82}$ is about 0.375 inches.

FIGS. 9-14 show various views of certain embodiments of the saddle 14 which provides a seat or housing for the female barrel 12. One or more of these figures may show hidden lines in phantom. The barrel 12 (an/or other suitable device components) can also be provided with markings such as, but not limited to, product identification, country of manufacture, certification standard, and brand name, logo or trademark.

In some embodiments, the saddle 14 generally comprises a generally U-shaped configuration or main body portion 42, a generally U-shaped and substantially central U-shaped slot or opening 44, and a pair of aligned though holes or openings 46, 48. The slot 44 is, in certain embodiments, advantageously configured and dimensioned to expose the female barrel threaded hole 38 such that it can mate with a male installation component, while desirably providing a predetermined angular degree of freedom.

The pair of aligned holes 46, 48, in some embodiments, are configured and dimensioned to receive and allow passage of the rivet structure 18. As discussed in more detail herein, in accordance with certain embodiments, the aligned holes 46, 48 are also aligned with a passage of the male stud 16 to receive the rivet structure 18 and couple various device components and form an assembly.

Figure 14:
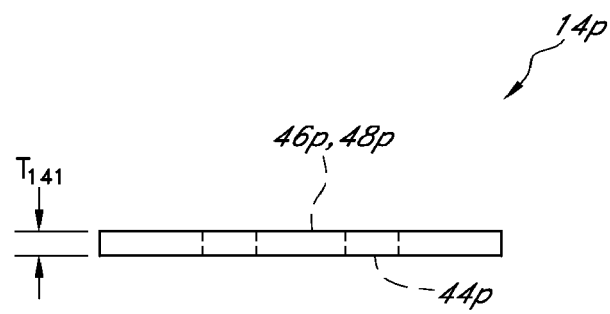
FIG. 14 is a simplified end view of the planar saddle view of FIG. 13 illustrating features and advantages in accordance with certain embodiments of the invention.
Figure 13:
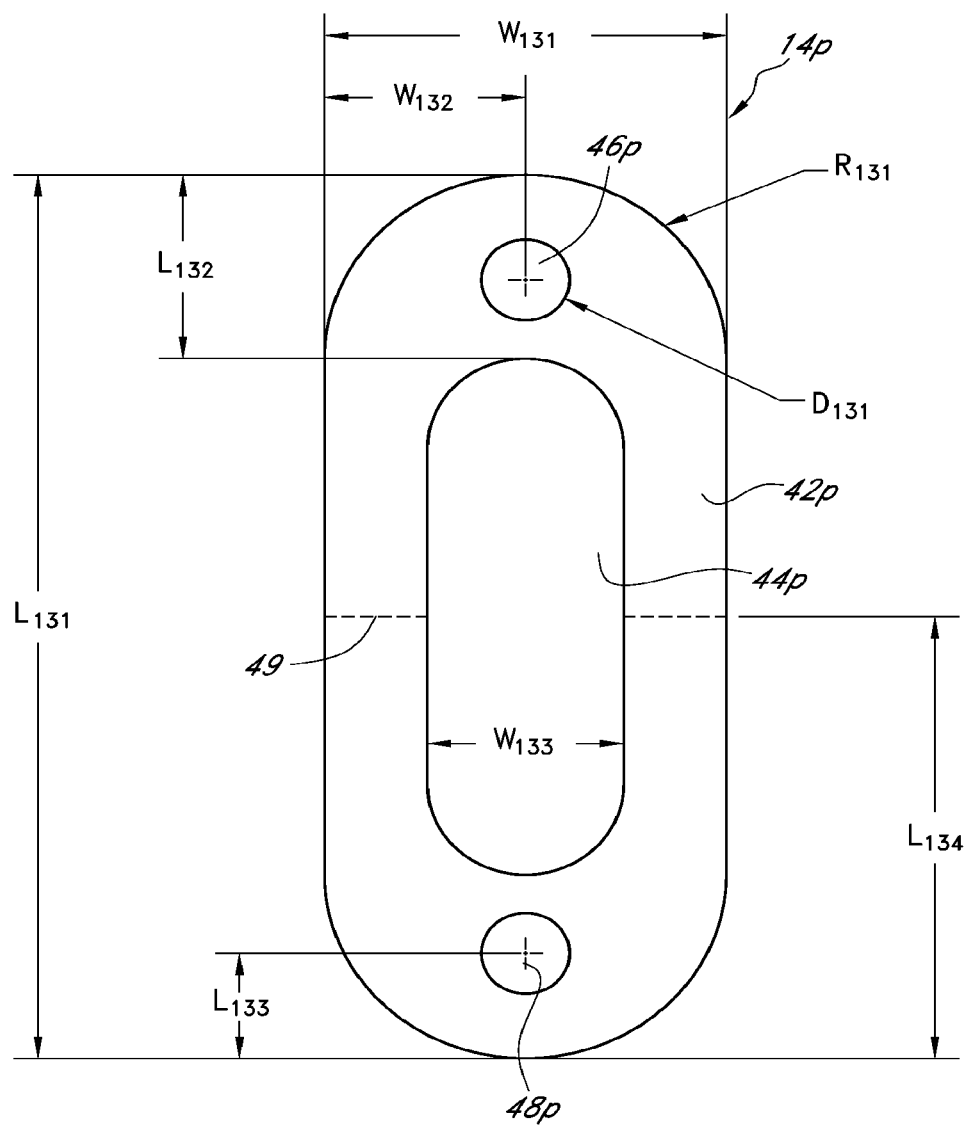
FIG. 13 is a simplified planar view of the saddle of FIG. 9 illustrating features and advantages in accordance with certain embodiments of the invention.

Referring in particular to FIGS. 13 and 14, planar and/or flat views of a saddle 14p are shown in accordance with some embodiments prior to the fabrication of the generally U-shaped saddle 14. The planar saddle 14p, of certain embodiments, comprises a generally flat and generally oval or ellipsoidal shaped structure 42p including a generally oval or ellipsoidal slot, opening or through hole 44p, and a pair of spaced through holes or openings 46p, 48p. The planar saddle 14p, in some embodiments, is bent generally about a substantially central axis or line 49 to form the generally U-shaped saddle 14 comprising the generally U-shaped structure 42 and slot 44, with the rivet receiving holes 46, 48 being substantially aligned with one another.

The planar saddle 14p, in some embodiments, comprises a pair of wings, extensions or body portions which are substantially parallel or offset by about 180°. The bending operation(s) about the substantially central axis or line 49 then aligns these wing portions to form the generally U-shaped saddle 14 with substantially aligned rivet receiving holes 46, 48.

The saddle 14 can be efficaciously sized and dimensioned in various manners, as needed or desired. Referring in particular to FIG. 10, in some embodiments, the dimension or length $L_{101}$ is about 1.064 inches, the dimension or length $L_{102}$ is about 0.814 inches, the dimension or width $W_{101}$ is about 0.875 inches, the dimension or width $W_{102}$ is about 0.220 inches, the dimension or width $W_{103}$ is about 0.434 inches, the dimension or width $W_{104}$ (and its symmetrical counterpart or mirror image) is about 0.438 inches, the diameter $D_{101}$ is about 0.196 inches, the radius of curvature $R_{101}$ is about 0.437 inches, and the radius of curvature $R_{102}$ is about 0.219 inches.

Referring in particular to FIG. 11, in some embodiments, the dimension or thickness $T_{111}$ is at least about 0.062 inches, and the radius of curvature $R_{111}$ is about 0.315 inches.

Referring in particular to FIG. 13, in some embodiments, the dimension or length $L_{131}$ is about 2.466 inches, the dimension or length $L_{132}$ is typically about 0.72 inches, the dimension or length $L_{133}$ is typically about 0.25 inches, the dimension or length $L_{134}$ is about 1.233 inches, the dimension or width $W_{131}$ is about 0.875 inches, the dimensions or widths $W_{132}$ and $W_{133}$ are about 0.438 inches, the diameter $D_{131}$ is typically about 0.196 inches, and the radius of curvature $R_{131}$ is typically about 0.438 inches. With reference to FIG. 14, in some embodiments, the dimension or thickness $T_{141}$ is about 0.062 inches.

FIGS. 15-21 show various views of certain embodiments of the rotatable, pivotable or swivelable male swivel stud 16. One or more of these figures also show hidden lines in phantom.

In some embodiments, the male tee stud 16 generally comprises a generally T-shaped (or inverted T-shaped) configuration with a generally U-shaped base member, element, portion or section 52 from which a male threaded rod, pin or connector 54 extends. The male stud 16 is advantageously substantially independently rotatable, pivotable or swivelable, about the rotation axis 26, as generally denoted by arrows 28, relative to the female barrel 12.

The male stud base 52, in certain embodiments, comprises a generally U-shaped configuration with a through hole or passage 58 substantially aligned with the pair of hole 46, 48 of the saddle 14. The rivet structure 18 extends through the holes 46, 58 and 48 to couple, connect or attach the rotatable male stud 16 and the saddle 14.

In some embodiments, the male stud base 52 comprises a generally curved or semi-circular distal end 56 that has a radius of curvature that generally conforms to (or is about the same as) the radius of curvature of the female barrel groove 36, such that at least a portion of the male base distal end 56 is swivelably received, positioned or located generally within a portion of the female barrel groove 36. This feature in conjunction with the use of the coupling rivet structure 18 advantageously does not permit the female barrel to slide out of or become disassembled from the swivel attachment unit 10. Respective curved portions or surfaces of the male base distal end 56 and the female barrel groove 36 can contact or abut against one another.

The male proximal portion 54, in some embodiments, comprises a threaded rod of a particular size to matingly engage an installation component, such as a female portion or threaded hole, opening or cavity, or the like. In modified embodiments, the male proximal portion 54 can efficaciously comprise other suitable male structures or members, such as, but not limited to connector pins, screws, bolts, other attachment devices with male features, or the like, as needed or desired.

The stud 16 can be efficaciously sized and dimensioned in various manners, as needed or desired. In some embodiments, the male threaded portion 54 is formed by using a standard ⅜-16 N.C. (Class 2B) size tap drill format.

Referring in particular to FIG. 16, in some embodiments, the dimension or length $L_{161}$ is about 1.187 inches, the dimension or length $L_{162}$ is about 0.750 inches, the dimension or length $L_{163}$ is about 0.437 inches, the dimension or width $W_{161}$ is about 0.625 inches, and the diameter $D_{161}$ is about 0.374 inches.

Referring in particular to FIG. 17, in some embodiments, the dimension or length $L_{171}$ is about 0.187 inches, the diameter $D_{171}$ is about 0.196 inches, and the radius of curvature $R_{187}$ is about 0.187 inches. With reference to FIG. 18, in some embodiments, the diameter $D_{181}$ is about 0.374 inches.

Figure 19:
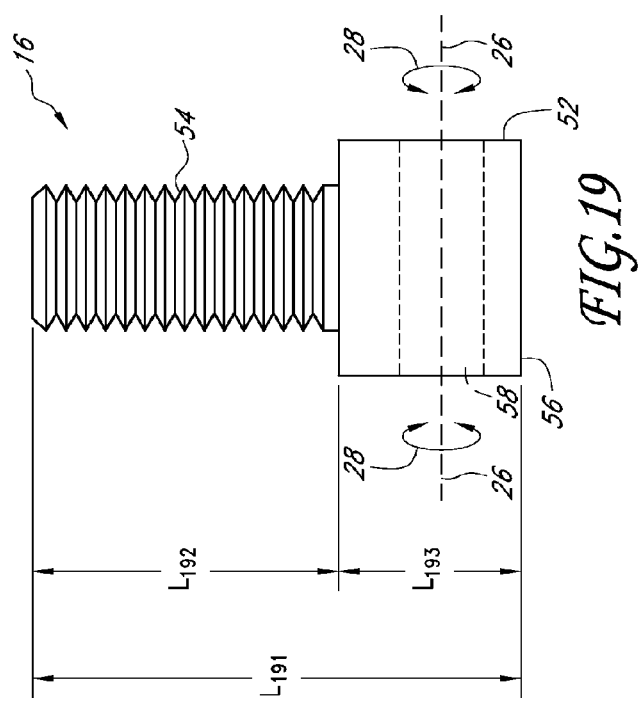
FIG. 19 is another simplified front view of the swivel stud of FIG. 15 (showing some hidden lines) illustrating features and advantages in accordance with certain embodiments of the invention.

Referring in particular to FIG. 19, in some embodiments, the dimension or length $L_{191}$ is about 1.189 inches, the dimension or length $L_{192}$ is about 0.750 inches, and the dimension or length $L_{193}$ is about 0.439 inches.

Figure 20:
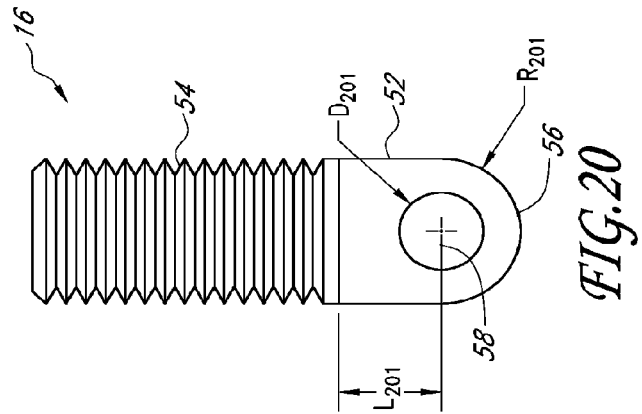
FIG. 20 is another simplified side view of the swivel stud of FIG. 15 illustrating features and advantages in accordance with certain embodiments of the invention.

Referring in particular to FIG. 20, in some embodiments, the dimension or length $L_{201}$ is about 0.252 inches, the diameter $D_{201}$ is about 0.196 inches, and the radius of curvature $R_{201}$ is about 0.188 inches.

Figure 21:
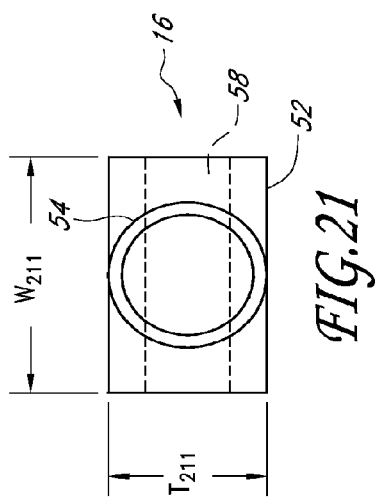
FIG. 21 is another simplified top view of the swivel stud of FIG. 15 (showing some hidden lines) illustrating features and advantages in accordance with certain embodiments of the invention.

Referring in particular to FIG. 21, in some embodiments, the dimension or width $W_{211}$ is about 0.625 inches, and the dimension or thickness $T_{211}$ is about 0.375 inches.

FIGS. 22 and 23 show various views of certain embodiments of the rivet member, structure, element, portion or section 18. The rivet structure 18, in some embodiments, generally defines the rotation axis 26 about which the male swivel stud 16 rotates, pivots or swivels. In certain embodiments, the rivet structure 18 generally comprises a generally cylindrical central shank, stem, tube or main body portion 62 which spaces a pair of rivet heads or caps 66, 68 positioned at its opposed ends.

The central shank 62, in certain embodiments, extends through the aligned saddle holes 46, 48 and the male stud passage 58 to mechanically connect, couple or attach the saddle 14 and the male swivel stud 16, such that the interaction between the male stud 16 and the female barrel 12 also mechanically connects, couples or attaches the female barrel 12 to the other device components, and thereby form an assembly comprises the swivel attachment 10.

In certain embodiments, the rivet structure 18 comprises a tubular rivet with the central portion or shank 62 being at least partially hollow. In modified embodiments, the rivet shank 62 can efficaciously be substantially solid or non-hollow, as needed or desired.

The rivet 18 can be efficaciously sized and dimensioned in various manners, as needed or desired. Referring in particular to FIG. 22, in some embodiments, the dimension or length $L_{221}$ is about 0.965 inches, the dimension or length $L_{222}$ is typically about 0.093 inches, and the diameter $D_{221}$ is about 0.187 inches.

Referring in particular to FIG. 23, in some embodiments, the diameter $D_{231}$ is about 0.28 inches, and the diameter $D_{232}$ is about 0.141 inches.

Figure 25:
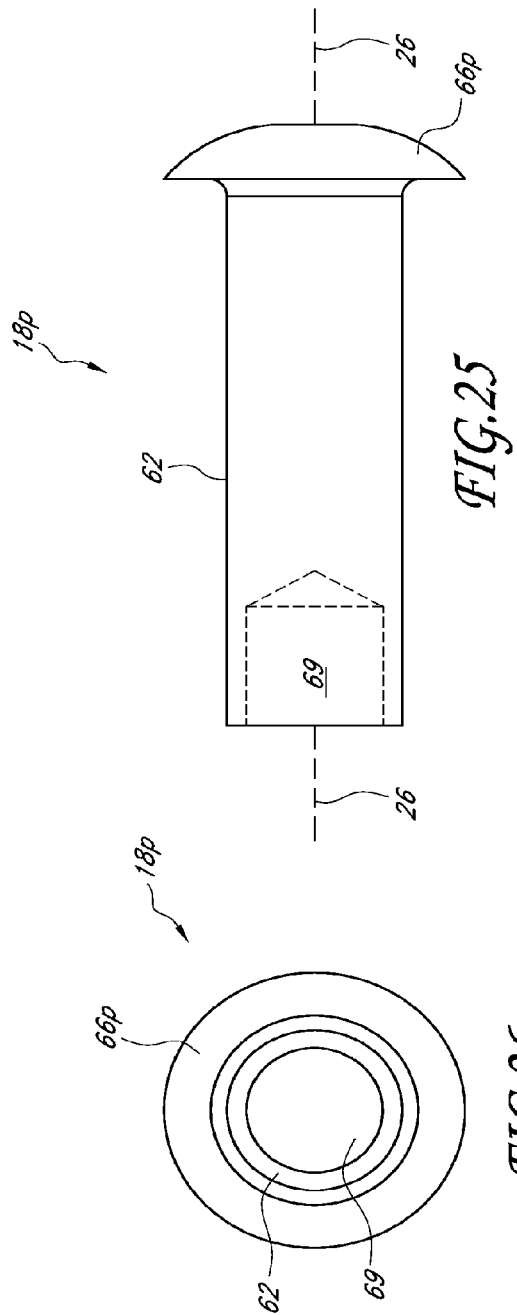
FIG. 25 is a simplified side view of the partially assembled rivet member of FIG. 24 illustrating features and advantages in accordance with certain embodiments of the invention.
Figure 24:
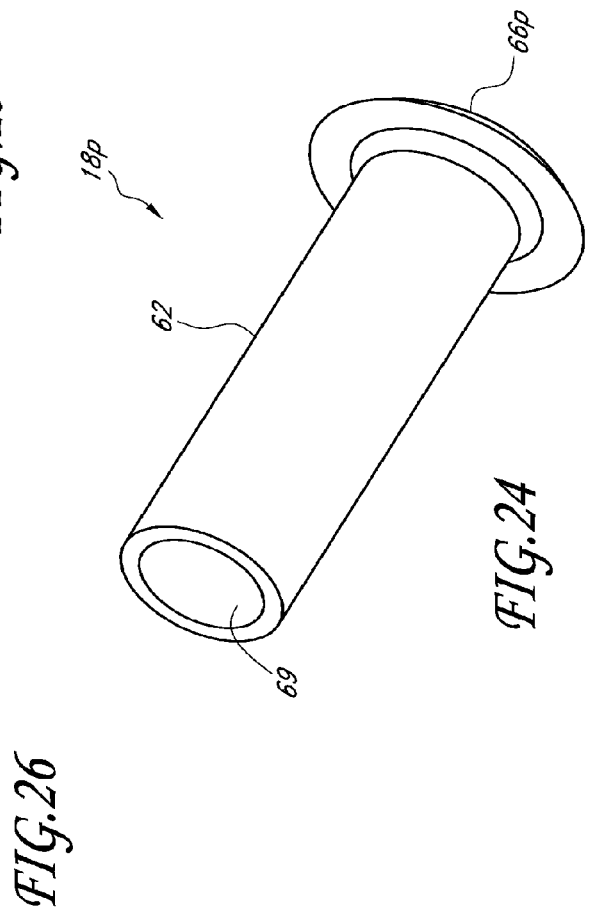
FIG. 24 is a simplified perspective view of another rivet member of FIGS. 1-3 (comprising a modified rivet head and being partially assembled) illustrating features and advantages in accordance with certain embodiments of the invention.
Figure 26:
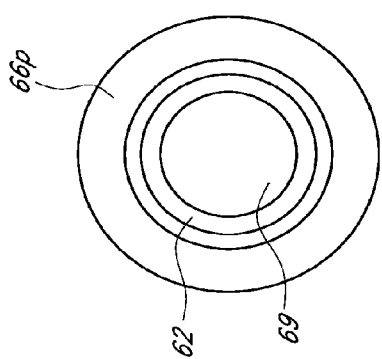
FIG. 26 is a simplified end view of the partially assembled rivet member of FIG. 24 illustrating features and advantages in accordance with certain embodiments of the invention.

FIGS. 24-26 show various views of certain embodiments of a partially assembled or fabricated rivet member, structure, element, portion or section 18*p* comprising a rivet head 66*p* with a modified design or configuration. One or more of these figures shows some hidden lines.

The partially assembled rivet structure 18*p* comprises a hole, opening or cavity 69 at an opposed end relative to the rivet head 66*p* to facilitate attachment of a second rivet head (not shown) once the rivet shank or tube 62 has been positioned to extend through the aligned saddle holes 46, 48 and the male stud passage 58, thereby substantially completing assembly, manufacture or fabrication of the swivel attachment device. A rivet gun or the like, among others, can be efficaciously used to secure the second rivet head, as needed or desired.

The use of a rivet type design, structure or configuration such as 18 (or 18*p*), in certain embodiments, desirably provides a substantially permanent or quasipermanent coupling or connection between components of the swivel attachment assembly which can then not be readily or accidentally disassembled. Advantageously, this also substantially prevents the device components from becoming uncoupled due to usage in an installation and/or over a period of time. In modified embodiments, a temporary coupling or connection may be provided, for example, by using a nut-bolt type of design, with efficacy, as needed or desired.

Any of the embodiments of the swivel attachment device disclosed, taught or suggested herein, such as the swivel attachment 10, can be provided to be adaptable for use with different sizes of installation components. In certain embodiments, the swivel attachment is configured to mate with and/or be compatible with a standard ⅜ inch threaded rod structure or threaded hole configuration.

In some modified embodiments, it is contemplated that a single swivel attachment device may be utilized as a male-male, male-female or female-female device. For example, this may be accomplished by providing a pair of independently rotatable, and at least partially hollow, rods with an outer threaded portion of a certain size and an inner threaded portion of a certain threaded size. Thus, both the rods of the swivel attachment device may either engage a female or a male installation component, as needed or desired.

Any of the embodiments of the swivel attachment device (such as the swivel attachment 10) disclosed, taught or suggested herein desirably comprise components fabricated from a suitably strong material. In some embodiments, the components of any of the swivel attachment embodiments comprise steel such as mild steel or carbon steel. The steel can have a plain finish, or in some embodiments, it can have pre-galvanized or electrogalvanized finish.

In other embodiments, the components of any of the swivel attachment embodiments can efficaciously comprise other suitable alloys, metals, ceramics, plastics, thermoplastics, organic materials and the like, and any combinations thereof, as needed or desired. Any suitable surface finish or coating may be provided with efficacy, as needed or desired.

Any of the components of embodiments of the swivel attachment device (such as the swivel attachment 10) disclosed, taught or suggested herein can be fabricated or manufactured by utilizing a wide variety of techniques or methods. These include, without limitation, machining, stamping, bending and/or punching, casting, forging, molding, lasing, laser processing, welding, gluing, adhesively fixing, and any combinations thereof, among others, as required or desired.

Any of the components of embodiments of the swivel attachment device (such as the swivel attachment 10) disclosed, taught or suggested herein can be fabricated as integral units or integrally formed. In modified embodiments, any of the device components can efficaciously be manufactured by fabricating separate portions and then joining these together to form the device component.

In some embodiments, the female barrel 12 and the male stud 16 (and any of their other embodiments disclosed, taught or suggested herein) are formed, fabricated or manufactured by machining, drilling and/or threading operations.

In some embodiments, the partially formed one-headed rivet member, such as 18p, (and any of its other embodiments disclosed, taught or suggested herein) is formed, fabricated or manufactured by machining and drilling operations and/or casting and molding operations. The second rivet head can then be connected, attached or coupled, in some embodiments, by welding, adhesively gluing, or the like, among others, with efficacy, as needed or desired.

In some embodiments, the saddle 14 (and any of its other embodiments disclosed, taught or suggested herein) is formed, fabricated or manufactured by stamping, bending and/or punching operations. A generally flat strip of material can be stamped and/or punched into a suitable shape and arrangement (see, for example, the planar saddle shape of FIG. 13) by stamping and/or punching operations. The planar saddle shape can then be bent around a bending axis or line (see, for example, the line 49 of FIG. 13) to form the saddle 14 and any of its embodiments.

Advantageously, such a manufacturing process is especially suited for automated assembly lines, wherein stamping, punching and bending operations can be performed at high speeds and pick-and-place robotic arms or systems can efficiently manipulate the component(s) and control the manufacturing process. Moreover, the simplicity and speed of this manufacturing method results in an end product that is economical to manufacture, and thus is desirably inexpensive.

Some Installation Embodiments

Figure 27:
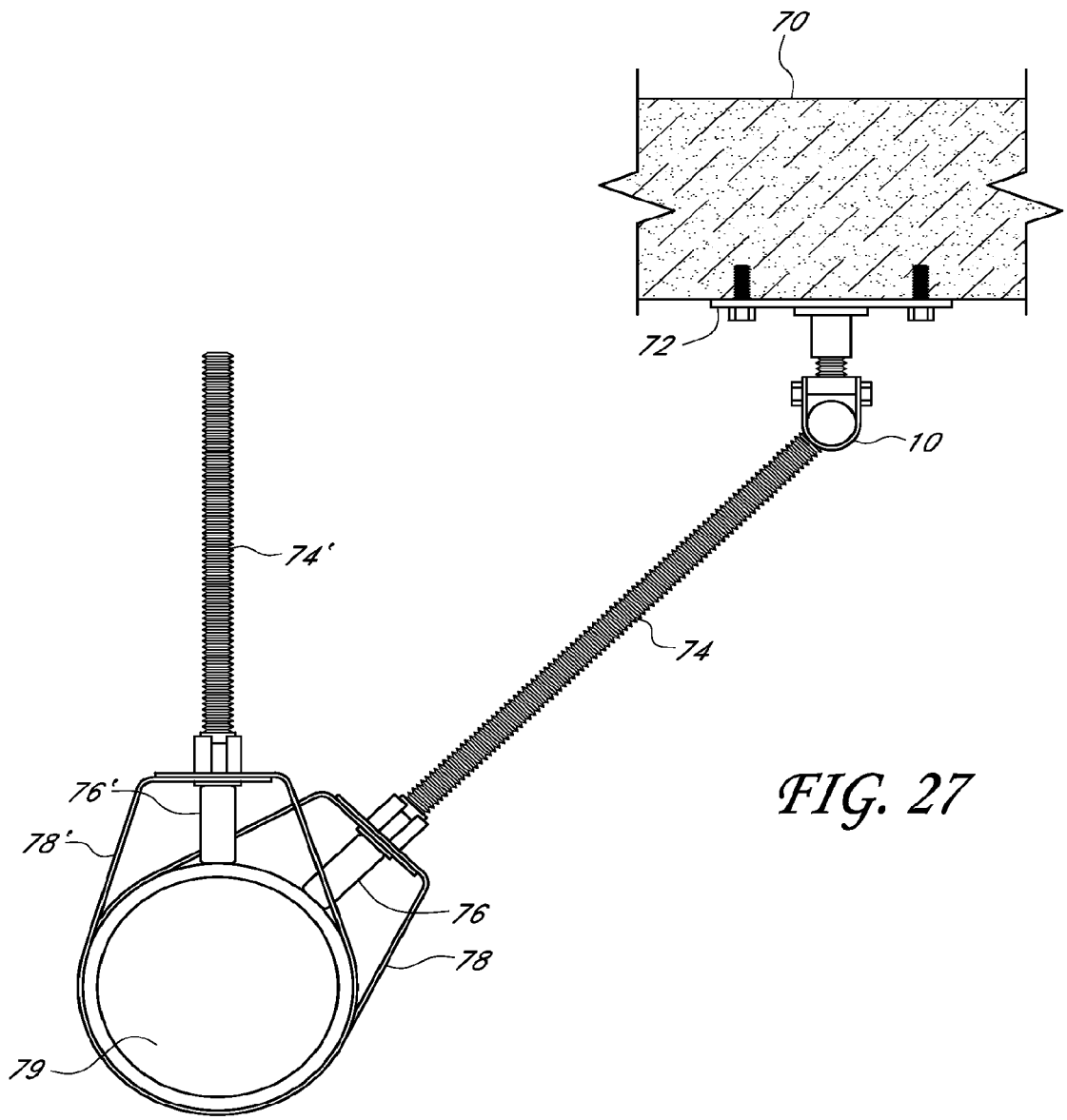
FIG. 27 is a simplified view of an installation using the swivel attachment of FIGS. 1-3 as a structural attachment component of an end of branch restraint illustrating features and advantages in accordance with certain embodiments of the invention.
Figure 28:
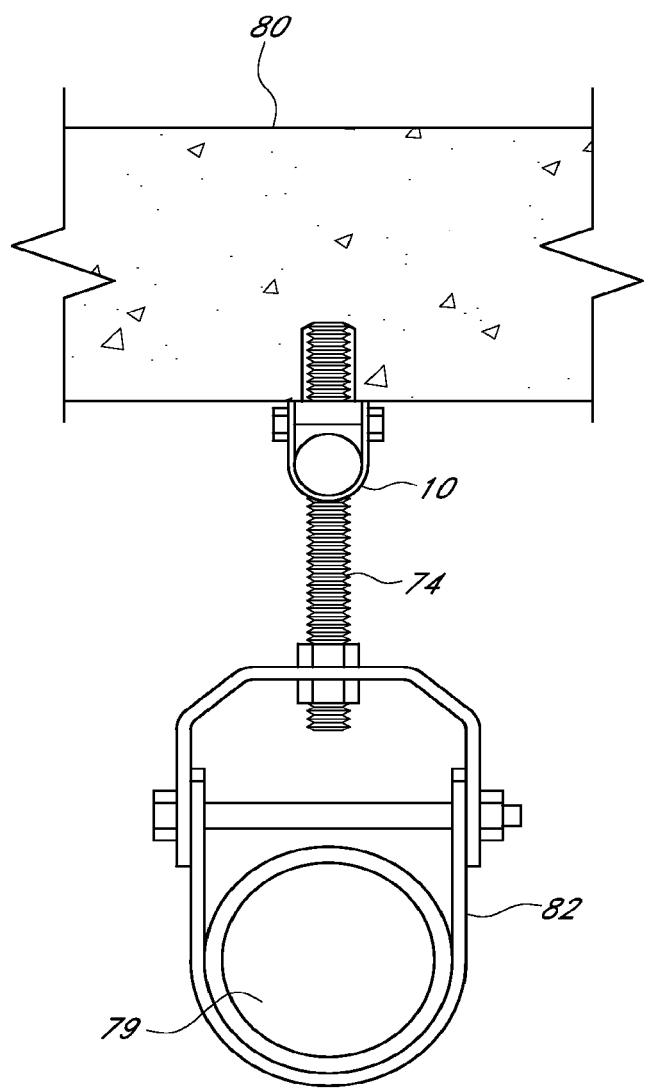
FIG. 28 is a simplified view of an installation using the swivel attachment of FIGS. 1-3 as an upper attachment with short hanger rod to omit seismic bracing illustrating features and advantages in accordance with certain embodiments of the invention.
Figure 29:
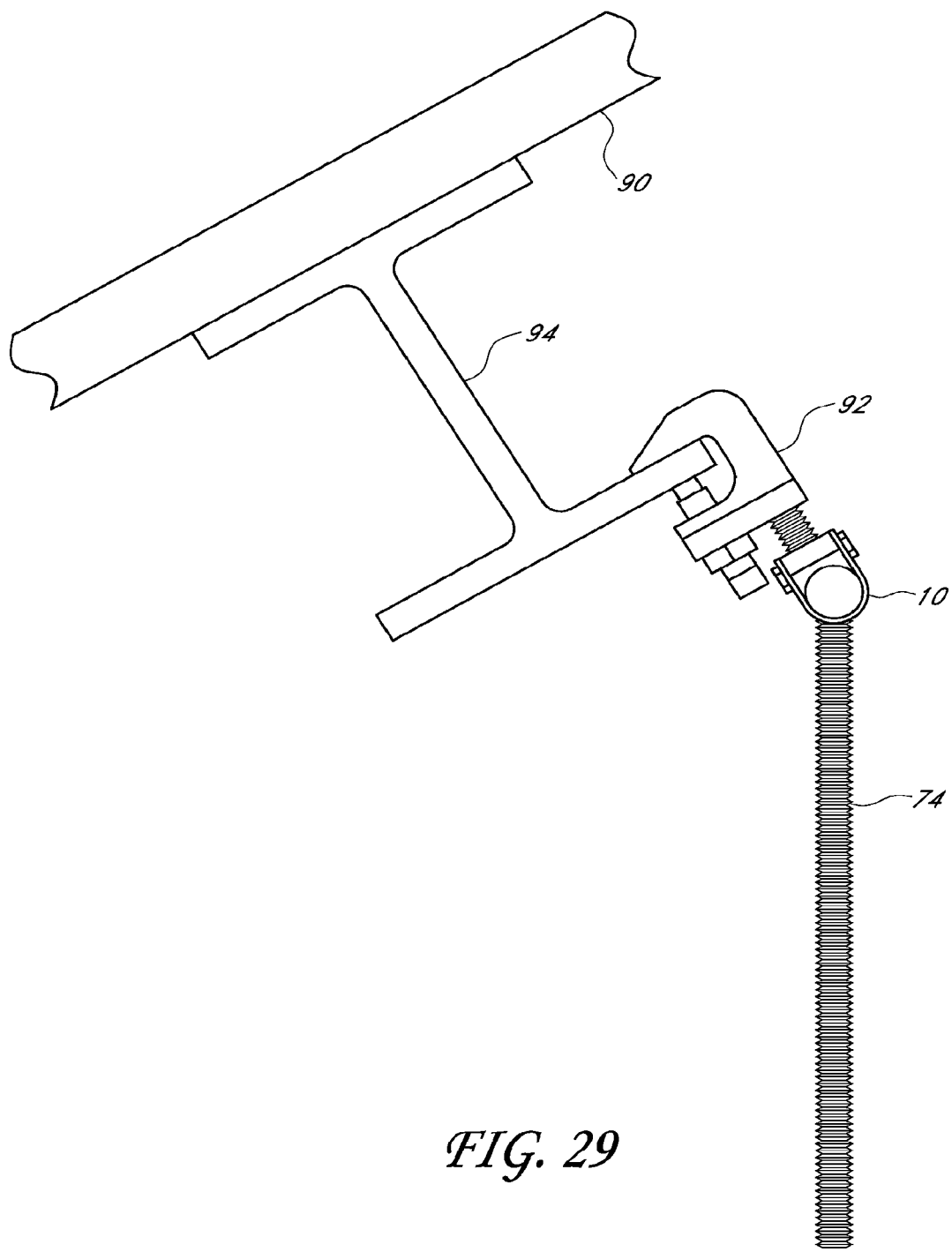
FIG. 29 is a simplified view of an installation using the swivel attachment of FIGS. 1-3 in a pitched roof application illustrating features and advantages in accordance with certain embodiments of the invention.
Figure 30:
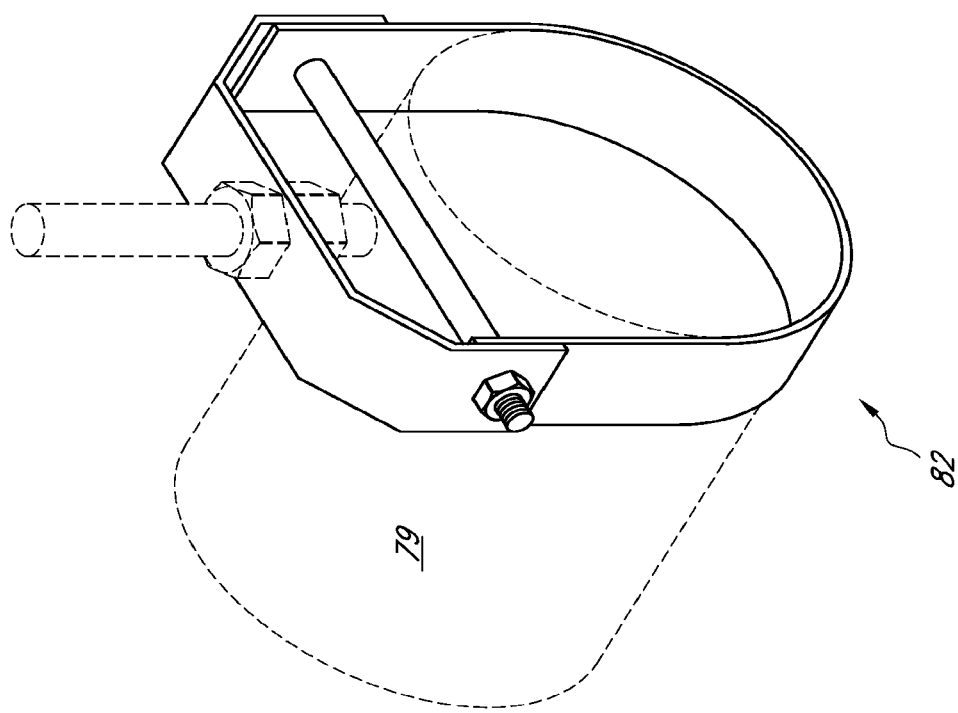
FIG. 30 is a simplified view of a clevis hanger for use in conjunction with the swivel attachment of FIGS. 1-3 to form an installation illustrating features and advantages in accordance with certain embodiments of the invention.
Figure 31:
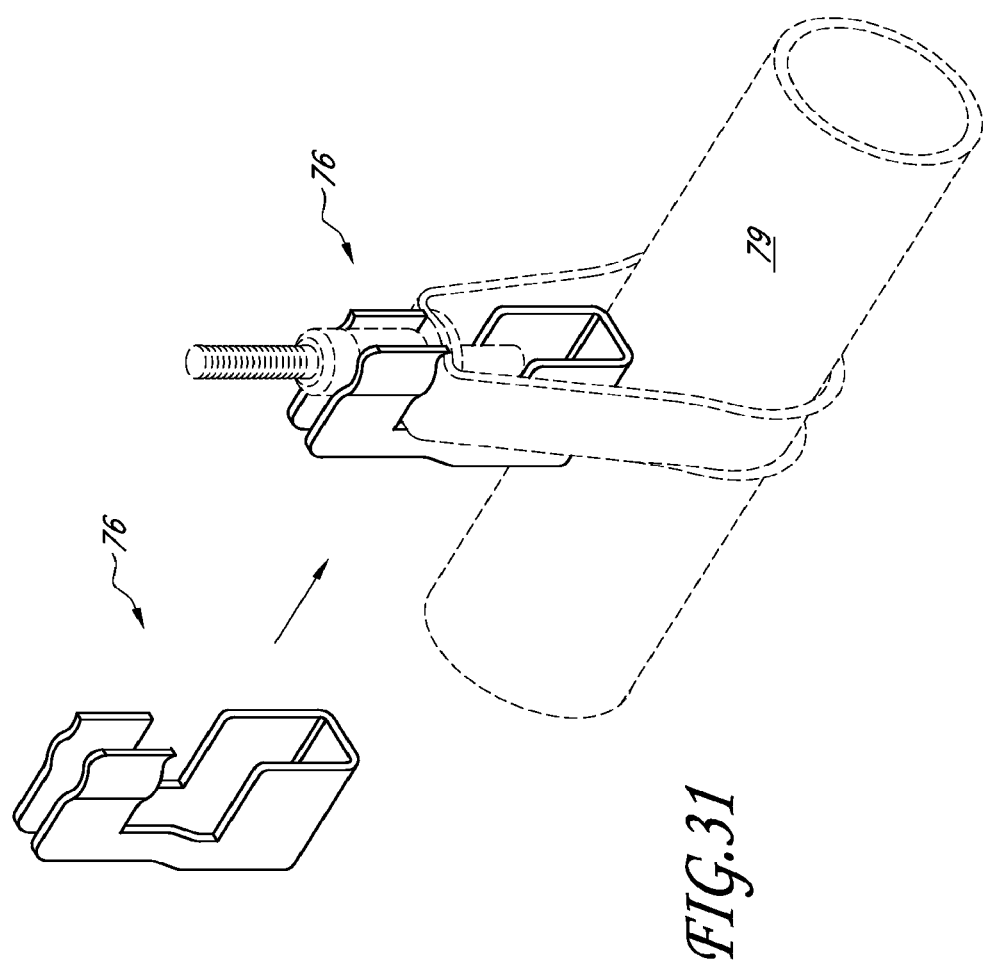
FIG. 31 is simplified views of a surge restrainer for use in conjunction with the swivel attachment of FIGS. 1-3 to form an installation illustrating features and advantages in accordance with certain embodiments of the invention.
Figure 32:
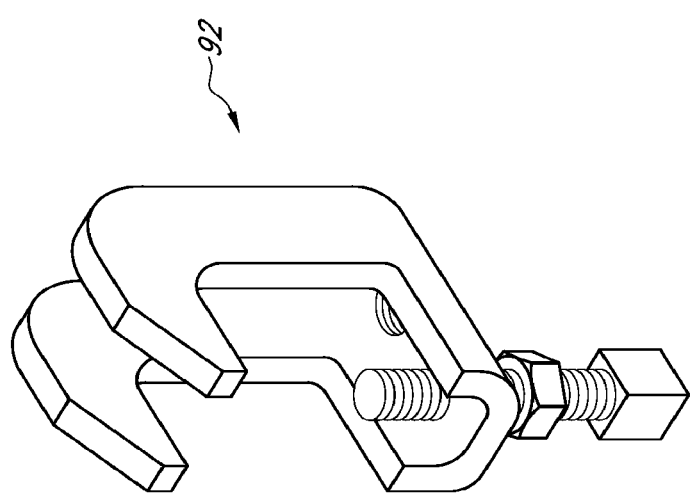
FIG. 32 is simplified views of a reversible C-type beam clamp for use in conjunction with the swivel attachment of FIGS. 1-3 to form an installation illustrating features and advantages in accordance with certain embodiments of the invention.

FIGS. 27-29 show various embodiments of installation that utilize the swivel attachment and/or branch restraint device 10. As the skilled artisan will appreciate, any of the embodiments of the swivel attachment device disclosed, taught or suggested herein can be efficaciously used, or adapted to be used, in substantially the same or similar installations, among others, as needed or desired.

FIGS. 30-35 show embodiments of various devices which can be used in conjunction with the swivel attachment and/or branch restraint device 10 to form the installations of FIG. 27-29. Again, as the skilled artisan will appreciate, any of the embodiments of the swivel attachment device disclosed, taught or suggested herein can be efficaciously used, or adapted to be used, in substantially the same or similar manner with the devices of FIGS. 30-35, among others, as needed or desired.

The installation embodiments of FIGS. 27-29 illustrate the versatility of embodiments of a swivel attachment and branch line restraint device which, in certain embodiments, advantageously provides two substantially independent rotational (or angular) degrees of freedom (or two substantially independently controllable rotational degrees of freedom), to desirably facilitate connection and utility in a myriad of installation structures—the two degrees of freedom, in some embodiments, are desirably angularly offset or displaced relative to one another by a predetermined angle. In some embodiments, this predetermined angle is about 90°.

FIG. 27 shows an installation using the swivel attachment 10 as a structural attachment component of an end of branch restraint in accordance with certain embodiments. The swivel attachment 10 is advantageously used as an upper attachment for end of branch line restraint, such as a pipe, conduit 79 or other load which may be used for the transport of utility fluids, for example, but not limited to a fire sprinkler system, among others. In some embodiments, this arrangement may be used as a retrofit connection to provide, for example, additional support or bracing against undesirable sway and/or seismic activities or disturbances.

Referring m particular to the embodiments of FIG. 27, the swivel attachment 10 mates with a female member or threaded hole of a ceiling plate or bracket 72 (see FIG. 33) which is connected to a support structure such as, but not limited to, a wooden ceiling or beam 70, and also mates with a male member or threaded rod 74 (see FIG. 34) which in turn is mechanically connected, coupled or connected with a surge restrainer 76 (see FIG. 31) that is mechanically engaged or coupled with a band hanger 78 (see FIG. 35) and/or the load, pipe or conduit 79. Additional installation components such as a threaded rod 74', surge restrainer 76', and band hanger 78', among others, are also shown and can be utilized in the installation.

Some embodiments of the ceiling plate 72 and the surge restrainer 76 are disclosed in respective U.S. Pat. Nos. 5,702,077 and 5,344,108, the entirety of each one of which is hereby incorporated by reference herein, and comprises a part of the present application/specification.

FIG. 28 shows an installation using the swivel attachment 10 as an upper attachment with a short hanger rod to omit seismic bracing in accordance with certain embodiments. The swivel attachment 10 is advantageously used as a seismic rod attachment to a structure to support a pipe, conduit 79 or other load which may be used for the transport of utility fluids, for example, but not limited to a fire sprinkler system, among others.

Referring in particular to the embodiments of FIG. 28, the swivel attachment 10 mates with a female member or threaded hole of a support structure such as, but not limited to, a concrete ceiling or beam 80, and also mates with a male member or shortened threaded rod 74 (see FIG. 34) which in turn is mechanically engaged, connected, coupled or connected with a with a clevis hanger 82 (see FIG. 30) that supports the load, pipe or conduit 79.

FIG. 29 shows an installation using the swivel attachment 10 in a pitched roof application in accordance with certain embodiments. The swivel attachment 10 is advantageously used as an attachment for a hanger to connect to a pitched or angled roof or surface to support a pipe, conduit 79 or other load which may be used for the transport of utility fluids, for example, but not limited to a fire sprinkler system, among others. (A retaining strap can be utilized in this installation with efficacy, as needed or desired.)

Referring in particular to the embodiments of FIG. 29, the swivel attachment 10 mates with a female member or threaded hole of a reversible C-type beam clamp or hanger clamp body 92 (see FIG. 32), and also mates with a male member or threaded rod 74 (see FIG. 34) which in turn is mechanically engaged, connected, coupled or connected with the load, pipe or conduit 79. The clamp 92, in certain embodiments, is mechanically engaged, connected, coupled or connected with an I-beam 94 or the like which in turn is mechanically engaged, connected, coupled or connected with a support structure or surface such as, but not limited to, a pitched or angled roof, beam, or surface 90 or the like.

Some embodiments of the beam clamp 92 are disclosed in U.S. Pat. No. 4,570,885, the entirety of which is hereby incorporated by reference herein, and comprises a part of the present application/specification.

As one skilled in the art will readily recognize that by advantageously providing two substantially independent degrees of freedom (or two substantially independently controllable degrees of freedom), III certain embodiments of the swivel attachment and/or branch line restraint device, superior versatility and adaptability is achieved to desirably facilitate connection and utility in numerous sway and/or seismic bracing installation applications. These advantages can, in some embodiments, be further enhanced by controlling the angular offset between the two rotational degrees of freedom, for example, by controlling the angle between the planes in which the degrees of freedom provide rotational, swivel, or pivot motion.

The clevis hanger 82 (see, for example, FIG. 30) can advantageously be dimensioned in various sizes to allow use with various sizes of pipes 79, such as, but not limited to pipe sizes in the range from about ½ inch to about 36 inches. The pipes may be non-insulated or insulated.

The surge restrainer 76 (see, for example, FIG. 31) desirably allows one size to be used in conjunction with various sizes of pipes 79, such as, but not limited to pipe sizes in the range from about ¾ inch to about 2 inches. Advantageously, the surge restrainer facilitates in restricting undesirable movement (e.g., upwards movement) of piping as can occur during sprinkler head activation or earthquake type activity.

The clamp 92 (see, for example, FIG. 32) can advantageously accommodate beam flanges of different thicknesses. For example, by providing clamps 92 with different throat sizes, such as, but not limited to clamp throat sizes in the range from about ¾ inch to about 1¼ inches.

The ceiling plate 72 (see, for example, FIG. 33) can desirably be attached to various structures 70, such as, but not limited to, wood beams, ceilings, metal decks, walls, and the like. The plate 72 can also be welded to certain structures, such as, steel beams and the like, as needed or desired.

The threaded 74 (see, for example, FIG. 34) can advantageously be provided in various sizes. For example, but not limited to, rod sizes in the range from about ¼ inch to about 1½ inches, as needed or desired.

The band hanger 78 (see, for example, FIG. 35) can advantageously be dimensioned in various sizes to allow use with various sizes of pipes 79, such as, but not limited to pipe sizes in the range from about ½ inch to about 8 inches. Typical uses include, but are not limited to, fire sprinkler and other general piping applications and installations.

Some Other Embodiments of a Male-Female Swivel Attachment Device

FIGS. 36-38 show various views of a male-female swivel attachment and/or branch line restraint device 10mf in accordance with certain embodiments of the invention. The swivel attachment 10mf, in some embodiments, generally comprises a female nut member, element, portion or section 12f, a male stud member, element, portion or section 16m, and a common rivet structure, member, element, portion or section 18 that mechanically, couples, connects or attached the female nut 12f and the male stud 16m. Any of the embodiments of the rivet structure or connector pin can efficaciously be used in conjunction with the swivel attachment 10mf, as needed or desired.

In some embodiments, both the female nut 12f and the male stud 16m are rotatable, swivelable or pivotable about a common rotation axis 25 that is generally coincident or parallel with the reference Y-axis as generally denoted by arrows 27. The rotation axis 25, in certain embodiments, is generally defined by the rivet structure 18.

The rotation of the female nut 12f, in some embodiments, provides a first substantially independent degree of freedom which generally lies in the reference X-Z plane(s). The rotation of the male stud 16m, in some embodiments, provides a second substantially independent degree of freedom which also generally lies in the reference X-Z plane(s). Thus, at least in part due to the common rotation axis 25, both the male and female member degrees of freedom both lie in substantially the same plane, though both are desirably independently controllable.

FIGS. 39-44 show various views of certain embodiments of the rotatable, pivotable or swivelable female nut 12f. One or more of these figures may show hidden lines in phantom.

In some embodiments, the female nut 12f generally comprises a generally rectangular configuration with a pair of substantially aligned and spaced distal through holes or openings 33f, 35f which receive the rivet structure 18, and a generally central female threaded hole, cavity or opening 38f, extending from a proximal end of the female nut 12f, which is sized and configured to matingly engage an installation component, such as a threaded rod or the like. The female nut 12f is advantageously substantially independently rotatable, pivotable or swivelable, about the rotation axis 25, as generally denoted by arrows 27, relative to the male stud 16m.

The female nut 12f can be efficaciously sized and dimensioned in various manners, as needed or desired. In some embodiments, the threaded hole 38f is formed by using a standard ⅜-16 UNC 2B size tap drill format.

Referring in particular to FIG. 41, in some embodiments, the dimension or length $L_{411}$ is about 0.187 inches, the dimension or width $W_{411}$ is about 0.250 inches, and the diameter $D_{411}$ is about 0.201 inches.

Referring in particular to FIG. 42, in some embodiments, the dimension or length $L_{421}$ is about 0.437 inches, and the dimension or width $W_{421}$ is about 0.376 inches.

Referring in particular to FIG. 43, in some embodiments, the dimension or width $W_{431}$ is about 0.5 inches, the dimension or width $W_{432}$ is about 0.376 inches, the dimensions or widths $W_{433}$ and $W_{434}$ are about 0.062 inches, and the dimension or thickness $T_{431}$ is about 0.5 inches.

FIGS. 45-47 show various views of certain embodiments of the rotatable, pivotable or swivelable male swivel stud 16m. In some embodiments, the male stud 16m generally comprises a generally rectangular base member, element, portion or section 52m from which a male threaded rod, pin or connector 54m extends. The male stud 16m is advantageously substantially independently rotatable, pivotable or swivelable, about the rotation axis 25, as generally denoted by arrows 27, relative to the female nut 12f.

The male stud distal base 52m, in certain embodiments, comprises a through hole or passage 58m substantially aligned with and positioned between the pair of holes 33f, 35f of the female nut 16m. The rivet structure 18 extends through the holes 33f, 58m and 35f to couple, connect or attach the rotatable male stud 16m and the rotatable female nut 12f.

The male proximal portion 54m, in some embodiments, comprises a threaded rod of a particular size to matingly engage an installation component, such as a female portion or threaded hole, opening or cavity, or the like. In modified embodiments, the male proximal portion 54m can efficaciously comprise other suitable male structures or members, such as, but not limited to connector pins, screws, bolts, other attachment devices with male features, or the like, as needed or desired.

The male stud 16m can be efficaciously sized and dimensioned in various manners, as needed or desired. In some embodiments, the male threaded portion Mm is formed by using a standard ⅜-16 UNC 2B size tap drill format.

Referring in particular to FIG. 46, in some embodiments, the dimension or length $L_{461}$ is about 0.68 inches, the dimension or length $L_{462}$ is about 0.5 inches, and the diameter $D_{461}$ is about 0.201 inches.

Referring in particular to FIG. 46, in some embodiments, the dimension or width $W_{471}$, the dimension or thickness $T_{471}$, and the diameter $D_{471}$ are about 0.374 inches.

Some Embodiments of a Common Saddle/Center Swivel Attachment Device

The swivel attachment device in accordance with certain embodiments desirably comprises a common saddle or center member, element, portion or section which is rotatingly coupled to both mating members which are independently rotatable about respective rotation axes and which provide two substantially independent rotational degrees of freedom in respective planes which are angularly offset relative to one another by a predetermined angle. Advantageously, and as discussed further herein, the use of a common saddle or center member allows it to be efficaciously used in conjunction with anyone of male-female, male-male or female-female device configurations, as needed or desired, to enhance production efficiency and versatility.

FIGS. 48-50 show different views of some embodiments of a common-center male-female swivel attachment or connector (and branch line restraint) device 10mf'. The swivel attachment 10mf', in accordance with certain embodiments, and as discussed in further detail herein, comprises a male member, element, portion or section and a female member, element, portion or section. The swivel attachment male member can comprise a threaded rod, pin, connector, other suitable attachment device or the like, among others which matingly engages a female member, for example, of an installation component. The swivel attachment female member can comprise a threaded hole, cavity, opening, other suitable attachment device or the like, among others which matingly engages a male member, for example, of an installation component.

In some embodiments, the swivel attachment 10mf' generally comprises a female nut, member, element, portion or section 12f', a saddle or center member, element, portion or section 14', a male stud, member, element, portion or section 16m', and a pair of rivet members, structures, elements, portions or sections 18f', 18m' that respectively mechanically couple, connect or attach female member 12f' and the male member 16m' to the center saddle member 14' to form an assembly. Any of the embodiments of the rivet structure or connector pin can efficaciously be used in conjunction with the swivel attachment 10mf', as needed or desired.

The female nut 12f' is rotatable, pivotable or swivelable about an axis 22' that is generally coincident or parallel with the Y-axis as generally depicted by arrows 24' to provide a first rotational degree of freedom which generally lies in the reference X-Z plane(s). The rotation axis 22', in certain embodiments, is generally defined by the rivet structure 18f'.

The male stud 16m' is rotatable, pivotable or swivelable about an axis 26' that is generally coincident or parallel with the X-axis as generally depicted by arrows 28' to provide a second rotational degree of freedom which generally lies in the reference Y-Z plane(s). The rotation axis 26', in certain embodiments, is generally defined by the rivet structure 18m'.

These two rotational degrees of freedom, as provided by the male and female members 12f' and 16m', are substantially independent of one another and can be controlled substantially independently to provide enhanced versatility in connecting the swivel attachment 10mf' to, for example, installations with varying angular configurations.

The two degrees of freedom and/or the planes in which the female nut 12f' and the male stud 16m' rotate, pivot or swivel are, in some embodiments, substantially perpendicular (that is, at 90°) to one another. In modified embodiments, the two degrees of freedom and/or the respective corresponding planes they represent may efficaciously be oriented relative to one another at larger or smaller angles, for example, at (90°±θ), where θ is in the range from about greater than 0° to about less than 90°, including all values and subs-ranges therebetween, as needed or desired.

In certain embodiments, the two rotation axes 22' and 26' are substantially perpendicular (that is, at 90°) to one another and are spatially offset (in a Z-direction) relative to one another. In other embodiments, the two rotation axes may spatially intersect or substantially overlap, as needed or desired. In modified embodiments, the two rotation axes may efficaciously be oriented relative to one another at larger or smaller angles, for example, at (90°±α), where α is in the range from about greater than 0° to about less than 90°, including all values and subs-ranges therebetween, as needed or desired.

FIGS. 51-53 show different views of some embodiments of a common-center male-male swivel attachment or connector (and branch line restraint) device 10mm'. The swivel attachment 10mm', in accordance with certain embodiments, and as discussed in further detail herein, comprises a pair of male members, elements, portions or sections. The swivel attachment male members can comprise a threaded rod, pin, connector, other suitable attachment device or the like, among others which matingly engages a female member, for example, of an installation component.

In some embodiments, the swivel attachment 10mm' generally comprises a first male stud, member, element, portion or section 16m1', a saddle or center member, element, portion or section 14', a second male stud, member, element, portion or section 16m2', and a pair of rivet members, structures, elements, portions or sections 18m1', 18m2' that respectively mechanically couple, connect or attach first male member 16m1' and the second male member 16m2' to the center saddle member 14' to form an assembly. Any of the embodiments of the rivet structure or connector pin can efficaciously be used in conjunction with the swivel attachment 10mm', as needed or desired.

The first male stud 16*m*1' is rotatable, pivotable or swivelable about an axis 26*m*1' that is generally coincident or parallel with the X-axis as generally depicted by arrows 28*m*1' to provide a first rotational degree of freedom which generally lies in the reference Y-Z plane(s). The rotation axis 26*m*1', in certain embodiments, is generally defined by the rivet structure 18*m*1'.

The second male stud 16*m*2' is rotatable, pivotable or swivelable about an axis 26*m*2' that is generally coincident or parallel with the Y-axis as generally depicted by arrows 28*m*2" to provide a second rotational degree of freedom which generally lies in the reference X-Z plane(s). The rotation axis 26*m*2', in certain embodiments, is generally defined by the rivet structure 18*m*2'.

These two rotational degrees of freedom, as provided by the male members 16*m*1' and 16*m*2', are substantially independent of one another and can be controlled substantially independently to provide enhanced versatility in connecting the swivel attachment 10*mm*' to, for example, installations with varying angular configurations.

The two degrees of freedom and/or the planes in which the first male stud 16*m*1' and the second male stud 16*m*2' rotate, pivot or swivel are, in some embodiments, substantially perpendicular (that is, at 90°) to one another. In modified embodiments, the two degrees of freedom and/or the respective corresponding planes they represent may efficaciously be oriented relative to one another at larger or smaller angles, for example, at (90°±θ), where θ is in the range from about greater than 0° to about less than 90°, including all values and subs-ranges therebetween, as needed or desired.

In certain embodiments, the two rotation axes 26*m*1' and 26*m*2' are substantially perpendicular (that is, at 90°) to one another and are spatially offset (in a Z-direction) relative to one another. In other embodiments, the two rotation axes may spatially intersect or substantially overlap, as needed or desired. In modified embodiments, the two rotation axes may efficaciously be oriented relative to one another at larger or smaller angles, for example, at (90°±α), where α is in the range from about greater than 0° to about less than 90°, including all values and subs-ranges therebetween, as needed or desired.

FIGS. 54-56 show different views of some embodiments of a common-center female-female swivel attachment or connector (and branch line restraint) device 10*ff*. The swivel attachment 10*ff*, in accordance with certain embodiments, and as discussed in further detail herein, comprises a pair of female members, elements, portions or sections. The swivel attachment female members can comprise a threaded hole, cavity, opening, other suitable attachment device or the like, among others which matingly engages a male member, for example, of an installation component.

In some embodiments, the swivel attachment 10*ff* generally comprises a first female nut, member, element, portion or section 12*f*1', a saddle or center member, element, portion or section 14', a second female nut, member, element, portion or section 12*f*2', and a pair of rivet members, structures, elements, portions or sections 18*f*1', 18*f*2' that respectively mechanically couple, connect or attach first female member 12*f*1' and the second female member 12*f*2' to the center saddle member 14' to form an assembly. Any of the embodiments of the rivet structure or connector pin can efficaciously be used in conjunction with the swivel attachment 10*ff*, as needed or desired.

The first female nut 12*f*1' is rotatable, pivotable or swivelable about an axis 22*f*1' that is generally coincident or parallel with the X-axis as generally depicted by arrows 24*f*1' to provide a first rotational degree of freedom which generally lies in the reference Y-Z plane(s). The rotation axis 22*f*1', in certain embodiments, is generally defined by the rivet structure 18*f*1'.

The second female nut 12*f*2' is rotatable, pivotable or swivelable about an axis 22*f*2' that is generally coincident or parallel with the Y-axis as generally depicted by arrows 24*f*2" to provide a second rotational degree of freedom which generally lies in the reference X-Z plane(s). The rotation axis 24*f*2', in certain embodiments, is generally defined by the rivet structure 18*f*2'.

These two rotational degrees of freedom, as provided by the female members 12*f*1' and 12*f*2', are substantially independent of one another and can be controlled substantially independently to provide enhanced versatility in connecting the swivel attachment 10*ff* to, for example, installations with varying angular configurations.

The two degrees of freedom and/or the planes in which the first female nut 12*f*1' and the second female nut 12*f*2' rotate, pivot or swivel are, in some embodiments, substantially perpendicular (that is, at 90°) to one another. In modified embodiments, the two degrees of freedom and/or the respective corresponding planes they represent may efficaciously be oriented relative to one another at larger or smaller angles, for example, at (90°±θ), where θ is in the range from about greater than 0° to about less than 90°, including all values and subs-ranges therebetween, as needed or desired.

In certain embodiments, the two rotation axes 22*f*1' and 22*f*2' are substantially perpendicular (that is, at 90°) to one another and are spatially offset (in a Z-direction) relative to one another. In other embodiments, the two rotation axes may spatially intersect or substantially overlap, as needed or desired. In modified embodiments, the two rotation axes may efficaciously be oriented relative to one another at larger or smaller angles, for example, at (90°±α), where α is in the range from about greater than 0° to about less than 90°, including all values and subs-ranges therebetween, as needed or desired.

FIGS. 57-61 show various views of certain embodiments of the swivel attachment saddle or center 14' which mechanically couples, connects or attaches to one or more of the female nuts 12*f* (12*f*1', 12*f*2') and/or one or more of the male studs 16*m*' (16*m*1', 16*m*2') depending on the particular swivel device embodiments, such as, a male-female or female-female device configuration. One or more of these figures also show hidden lines in phantom.

In some embodiments, the saddle or center 14' generally comprises a pair of mechanically connected generally U-shaped configurations or main body portions 42_1', 42_2', with a common connection central base member, element, portion or section 45'. The main body portions 42_1', 42_2', in certain embodiments, comprise respective substantially aligned through holes or passages 46_1', 48_1' and 46_2', 48_2' which are configured and dimensioned to receive and allow passage of appropriate rivet structures 18*f* (18*f*1', 18*f*2') and/or 18*m*' (18*m*1', 18*m*2') again depending on the particular swivel device embodiments, such as, a male-female or female-female device configuration.

As noted further herein, in accordance with certain embodiments, the aligned holes 46_1', 48_1' and 46_2', 48_2' are also aligned with through holes or passages of one or more of the female nuts 12*f* (12*f*1', 12*f*2') and/or one or more of the male studs 16*m*' (16*m*1', 16*m*2') to receive appropriate rivet structures 18*f* (18*f*1', 18*f*2') and/or 18*m*'

(18m1', 18m2') depending on the particular swivel device embodiments, such as, a male-female or female-female device configuration.

Referring in particular to FIG. 61, a planar and/or flat view of a swivel attachment saddle or center 14p' is shown in accordance with some embodiments prior to the fabrication of the generally double U-shaped saddle or center 14'.

The planar saddle 14p', of certain embodiments, comprises a generally flat and cross-shaped structure including a pair of wings, extensions or body portions 42_1p' and 42_2p' mechanically connected by a central portion 45p'. The flat portions 42_1p', 42_2p' comprise respective and corresponding through holes or openings 46_1p', 48-1p' and 46_2p', 48-2p'. The planar saddle 14p', in some embodiments, is bent generally about substantially straight axes or lines 49_16', 49-18' and 49_26', 49-28' such that holes 46_1', 48_1' are substantially aligned and holes 46_2', 48_2' are substantially aligned to form the generally double U-shaped swivel saddle or center 14'.

In some embodiments, the saddle 14' (and any of its other embodiments disclosed, taught or suggested herein) is formed, fabricated or manufactured by stamping, bending and/or punching operations. A generally flat strip of material can be stamped and/or punched into a suitable shape and arrangement (see, for example, the planar saddle shape of FIG. 61) by stamping and/or punching operations. The planar saddle shape can then be bent around bending axes or lines (see, for example, the lines 49_16', 49-18' and 49_26', 49-28' of FIG. 61) to form the saddle 14' and any of its embodiments.

The flat portions or wings 42_1p', 42_2p', in certain embodiments, are respectively perpendicularly offset or angularly offset by about 90° with respect to corresponding adjacent flat wing portions. The bending operations then orient these wing portions to form the saddle 14' with substantially aligned rivet receiving holes.

Advantageously, such a manufacturing process is especially suited for automated assembly lines, wherein stamping, punching and bending operations can be performed at high speeds and pick-and-place robotic arms or systems can efficiently manipulate the component(s) and control the manufacturing process. Moreover, the simplicity and speed of this manufacturing method results in an end product that is economical to manufacture, and thus is desirably inexpensive.

The saddle 14' can be efficaciously sized and dimensioned in various manners, as needed or desired. Referring in particular to FIG. 58, in some embodiments, the dimension or length $L_{581}$ is about 0.817 inches, the dimension or length $L_{582}$ is about 0.504 inches, the dimension or width $W_{581}$ is about 0.66 inches, the dimension or width $W_{582}$ is about 0.502 inches, the dimension or width $W_{583}$ is about 0.413 inches, the dimension or thickness $T_{581}$ is about 0.079 inches, the diameter $D_{581}$ is about 0.201 inches, the radius of curvature $R_{581}$ is about 0.313 inches, and the radius of curvature $R_{582}$ is about 0.187 inches.

Referring in particular to FIG. 59, in some embodiments, the dimension or width $W_{591}$ is about 0.207 inches, and the dimension or width $W_{592}$ is about 0.502 inches.

Referring in particular to FIG. 60, in some embodiments, the dimension or width $W_{601}$ is about 0.502 inches, and the dimension or width $W_{602}$ is about 0.414 inches.

Referring in particular to FIG. 61, in some embodiments, the dimension or length $L_{611}$ is about 2.151 inches, the dimension or length $L_{612}$ is about 1.526 inches, the dimension or width $W_{611}$ is about 2.151 inches, the dimension or width $W_{612}$ is about 0.413 inches, the dimension or width $W_{613}$ is about 1.526 inches, the diameter $D_{611}$ is about 0.201 inches (for all four holes), the radius of curvature $R_{611}$ is about 0.187 inches, the radius of curvature $R_{612}$ is about 0.313 inches, and the radius of curvature $R_{613}$ is about 0.062 inches (for all four corners).

FIGS. 62-65 show various views of certain embodiments of the rotatable, pivotable or swivelable female nut 12f (12f1', 12f2'). One or more of these figures may show hidden lines in phantom.

In some embodiments, the female nut 12f (12f1', 12f2') generally comprises a generally cylindrical configuration with a pair of substantially aligned and spaced distal through holes or openings 33f' (33f1', 33f2'), 35f' (35f1', 35f2') which receive the rivet structure 18f' (18f1', 18f2'), and a generally central female threaded hole, cavity or opening 38f' (28f1', 38f2'), extending from a proximal end of the female nut 12f (12f1', 12f2'), which is sized and configured to matingly engage an installation component, such as a threaded rod or the like. The female nut 12f' (12f1', 12f2') is advantageously substantially independently rotatable, pivotable or swivelable, about the rotation axis 22' (22f1', 22f2'), as generally denoted by arrows 24' (24f1', 24f2').

The through holes or openings 33f' (33f1', 33f2'), 35f' (35f1', 35f2'), in certain embodiments, are substantially aligned with and positioned between the pair of saddle or center member through holes (46_1',48_1') and/or (46_2', 48_2'). The rivet structure(s) 18f' (18f1', 18f2') and/or 18m' mechanically couple, connect or attach the various device components. As the skilled artisan will appreciate, the particular arrangement depends on whether the device comprises a male-female or female-female device configuration.

The female proximal portion 38f' (38f1', 38f2'), in some embodiments, comprises a threaded hole, cavity or opening of a particular size to matingly engage an installation component, such as a male portion or threaded rod, pin or connector, or the like. In modified embodiments, the female proximal portion 38f' (38f1', 38f2') can efficaciously comprise other female structures or members with suitable female features, such as, but not limited to clamping devices or fingers, to matingly engage a male member.

The female nut 12f' can be efficaciously sized and dimensioned in various manners, as needed or desired. In some embodiments, the threaded hole 38f' is formed by using a standard ⅜-16 UNC 2B size tap drill format.

Referring in particular to FIG. 63, in some embodiments, the dimension or length $L_{631}$ is about 0.625 inches, and the through diameter $D_{631}$ is about 0.201 inches (on both sides).

Referring in particular to FIG. 64, in some embodiments, the dimension or length $L_{641}$ is about 0.875 inches, the dimension or length $L_{642}$ is about 0.042 inches, and the angle $\theta_{641}$ is about 45°. With reference to FIG. 65, in some embodiments, the diameter $D_{651}$ is about 0.5 inches.

FIGS. 66-69 show various views of certain embodiments of the rotatable, pivotable or swivelable male swivel stud 16m' (16m1', 16m2'). In some embodiments, the male stud 16m' (16m1', 16m2') generally comprises a generally cylindrical base member, element, portion or section 52m' (52m1', 52m2') from which a male threaded rod, pin or connector 54m' (54m1', 54m2') extends. The male stud 16m' (16m1', 16m2') is advantageously substantially independently rotatable, pivotable or swivelable, about the rotation axis 26m (26m1', 26m2'), as generally denoted by arrows 28' (28m1', 28m2').

The male stud distal base 52m' (52m1', 52m2'), in certain embodiments, comprises a through hole or passage 58m' (58m1', 58m2') substantially aligned with and positioned between the pair of saddle or center member through holes (46_1', 48_1') and/or (46_2', 48_2'), and which receives the rivet structure 18m' (18m1', 18m2'). The rivet structure(s) 18m' (18m1', 18m2') and/or 18f' mechanically couple, connect or attach the various device components. As the skilled artisan will appreciate, the particular arrangement depends on whether the device comprises a male-female or male-male device configuration.

The male proximal portion 54m' (54m1', 54m2'), in some embodiments, comprises a threaded rod of a particular size to matingly engage an installation component, such as a female portion or threaded hole, opening or cavity, or the like. In modified embodiments, the male proximal portion 54m' (54m1', 54m2') can efficaciously comprise other suitable male structures or members, such as, but not limited to connector pins, screws, bolts, other attachment devices with male features, or the like, as needed or desired.

The male stud 16m' can be efficaciously sized and dimensioned in various manners, as needed or desired. In some embodiments, the male threaded portion 54m' is formed by using a standard ⅜-16 UNC 2B size tap drill format.

Referring in particular to FIG. 67, in some embodiments, the dimension or length $L_{671}$ is about 0.044 inches, and the angle $\theta_{671}$ is about 45°.

Referring in particular to FIG. 68, in some embodiments, the dimension or length $L_{681}$ is about 0.719 inches, the dimension or length $L_{682}$ is about 0.578 inches, the diameter $D_{681}$ is about 0.375 inches, and the through diameter $D_{682}$ is about 0.201 inches.

Referring in particular to FIG. 69, in some embodiments, the diameter $D_{691}$ is about 0.5 inches, and the diameter $D_{692}$ is about 0.375 inches.

Some Embodiments of a Cable Swivel Attachment Device

Figure 71:
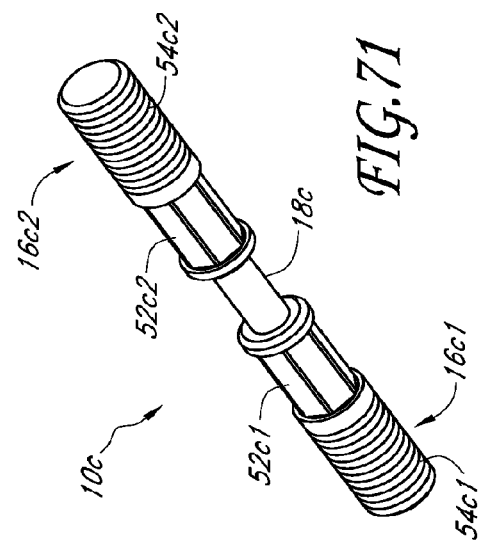
FIGS. 70-72 are simplified perspective views of a of a cable swivel attachment illustrating features and advantages in accordance with certain further embodiments of the invention.
Figure 72:
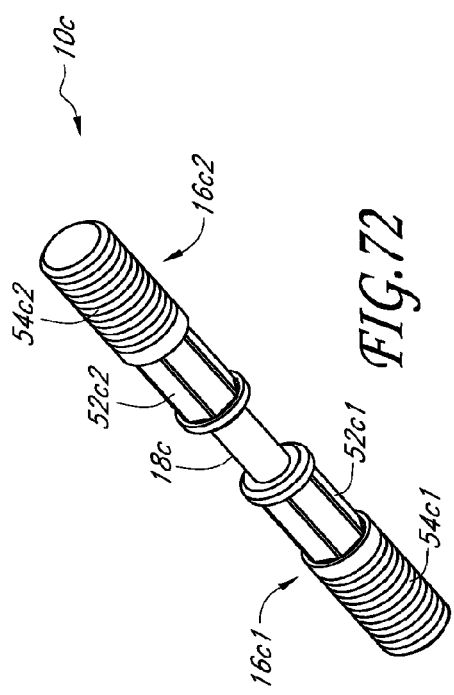
Figure 70:
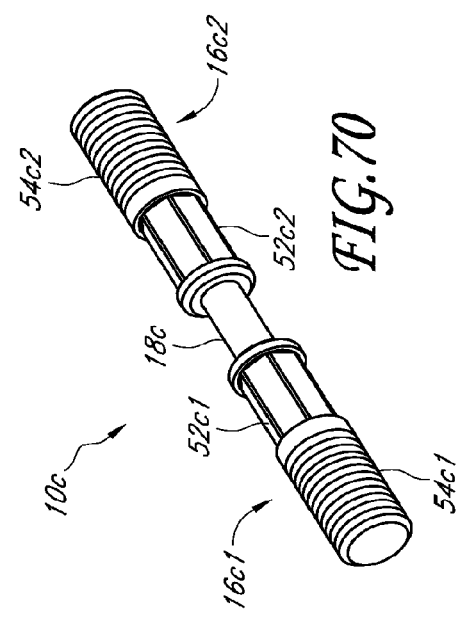

FIGS. 70-72 show various views of certain embodiments of a cable swivel attachment or connector (and branch line restraint) device 10c. Advantageously, in accordance with certain embodiments and/or installation applications, the cable swivel attachment 10c can provide a more cost-effective device.

The cable swivel attachment 10c generally comprises a pair of male mating studs, members, elements, portions or sections 16c1, 16c2 rotatably, swivelably or pivotably mechanically coupled or connected by a cable or wire rope 18c which provides substantially independent rotational or motional degrees of freedom (or substantially independently controllable degrees of freedom) of the male studs 16c1, 16c2 relative to one another. As the skilled artisan will appreciate, the device 10c can also be configured in a male-female or female-female configuration in accordance with certain other embodiments, as needed or desired.

In some embodiments, the male studs 16c1, 16c2 generally comprise respective proximal base members, elements, portions or sections 52c1, 52c2 from which respective male threaded rods, pins or connectors 54c1, 54c2 extend. The male studs 16cc1, 16c2 are advantageously substantially independently rotatable, pivotable or swivelable, relative to one another as generally determined by the construction of the coupling cable 18c.

The male proximal portions 54c1, 54c2, in some embodiments, comprise threaded rods of a particular size to matingly engage an installation component, such as a female portion or threaded hole, opening or cavity, or the like. In modified embodiments, the male proximal portions 54c1, 54c2 can efficaciously comprise other suitable male structures or members, such as, but not limited to connector pins, screws, bolts, other attachment devices with male features, or the like, as needed or desired.

In certain embodiments, the cable or wire rope 18c provides one or more of bending, twisting and/or torsional degrees of freedoms for the male studs 16c1, 16c2. These include, for example, but not limited to, pitch, yaw and/or roll motions or displacements. Any of the swivel attachment embodiments as disclosed, taught or suggested herein can efficaciously comprise rivets structures, cables or other rotation, swivel or pivot providing or enabling devices which desirably allow for substantially independent rotatable or swivel control of the device mating members.

The male distal portions 52c1, 52c2, in some embodiments, comprise swedged features which allow for a secure connection to opposing portions or ends of the cable 18c. In modified embodiments, the male distal portions 52c1, 52c2 can efficaciously comprise other suitable locking or clamping features to securely capture the cable 18c therebetween, as needed or desired.

In some embodiments, the male threaded portions 54c1, 54c2 are formed by using a standard ⅜-16 UNC 2B size tap drill format. In modified embodiments, other suitable thread sizes and the like can be efficaciously utilized, as needed or desired.

In certain embodiments, the cable 18c comprises (7×19) strand core prestretched galvanized aircraft cable. In modified embodiments, other types of cables, wires, ropes and the like can be efficaciously utilized, as needed or desired.

The cable 18c can be efficaciously dimensioned in various manners depending on the particular application. For example, the cable or wire rope 18c can have a diameter of about 3.18 mm (⅛ inch), 4.76 mm (³⁄₁₆ inch), 6.35 mm (¼ inch), among other suitable diameters which are smaller or larger, as needed or desired.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

It is to be understood that any range of values disclosed, taught or suggested herein comprises all values and sub-ranges therebetween. For example, a range from 5 to 10 will comprise all numerical values between 5 and 10 and all sub-ranges between 5 and 10.

From the foregoing description, it will be appreciated that a novel approach for a swivel attachment and/or branch restraint device has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using for connection purposes and the like, such as, for sway/seismic bracing and/or supporting functions in construction and/or utilities applications/installations for the same will be apparent to those of skill in the art. Accordingly, it should be understood that various applications, modifications, and substitutions may be made of equivalents without departing from the spirit of the invention or the scope of the claims.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the claims, including the full range of equivalency to which each element thereof is entitled.

What is claimed is:

1. A swivel attachment device, comprising:
a saddle including a base and opposing first and second arms extending outward from the base in a first direction, wherein the base and the first and second arms together have a generally U-shape;
a male mechanical fastener secured to the saddle, wherein the male fastener includes an externally threaded rod having a longitudinal axis and extending away from the base and the first and second arms;
a female mechanical fastener disposed between the first and second arms of the saddle, wherein the female mechanical fastener includes a threaded opening configured to threadably mate with a second threaded rod different from the externally threaded rod of the male fastener, wherein the female mechanical fastener is rotatably coupled to the first and second arms of the saddle such that the female mechanical fastener is rotatable about a rotation axis extending through the first and second arms.

2. The swivel attachment device set forth in claim 1, wherein the threaded opening has an opening axis extending transverse to the rotation axis.

3. The swivel attachment device set forth in claim 2, wherein the female mechanical fastener is rotatable about the rotation axis to align the opening axis of the threaded opening with the longitudinal axis of the externally threaded rod.

4. The swivel attachment device set forth in claim 3, wherein the female mechanical fastener is rotatable about the rotation axis to misalign the opening axis of the threaded opening relative the longitudinal axis of the externally threaded rod such that the opening axis of the threaded opening extends at an offset angle relative to the longitudinal axis of the externally threaded rod.

5. The swivel attachment device set forth in claim 1, wherein the female mechanical fastener is spaced apart from the base of the saddle in the first direction.

6. The swivel attachment device set forth in claim 1, wherein the rotation axis is generally parallel to the base of the saddle.

7. The swivel attachment device set forth in claim 1, further comprising a connector rotatable securing the female mechanical fastener to the first and second arms of the saddle.

8. The swivel attachment device set forth in claim 7, wherein the connector comprises a pin.

9. The swivel attachment device set forth in claim 7, wherein the connector comprises a rivet.

10. The swivel attachment device set forth in claim 1, wherein the female mechanical fastener extends outside the saddle.

11. The swivel attachment device set forth in claim 1, wherein the saddle further includes opposite third and fourth arms extending outward from the base in a second direction opposite the first direction, wherein the base and the third and fourth arms together have a generally U-shape, wherein the male mechanical fastener is coupled to the third and fourth arms.

12. The swivel attachment device set forth in claim 1, in combination with a beam clamp, wherein the externally threaded rod is threadably mated with the beam clamp.

13. The swivel attachment device set forth in claim 12, in further combination with the second threaded rod, wherein the second threaded rod is threadably mated with the threaded opening of the female mechanical fastener.

14. The swivel attachment device set forth in claim 1, in combination with the second threaded rod, wherein the second threaded rod is threadably mated with the threaded opening of the female mechanical fastener.

15. The swivel attachment device set forth in claim 14, in further combination with a pipe hanger, wherein the pipe hanger is coupled to the second threaded rod.

* * * * *